(12) United States Patent
Ramasamy et al.

(10) Patent No.: US 11,188,429 B2
(45) Date of Patent: Nov. 30, 2021

(54) BUILDING A HIGHLY-RESILIENT SYSTEM WITH FAILURE INDEPENDENCE IN A DISAGGREGATED COMPUTE ENVIRONMENT

(71) Applicant: INTERNATIONAL BUSINESS MACHINES CORPORATION, Armonk, NY (US)

(72) Inventors: HariGovind V. Ramasamy, Ossining, NY (US); Eugen Schenfeld, South Brunswick, NJ (US); Valentina Salapura, Chappaqua, NY (US); John A. Bivens, Ossining, NY (US); Min Li, San Jose, CA (US); Ruchi Mahindru, Elmsford, NY (US); Yaoping Ruan, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 16/204,602

(22) Filed: Nov. 29, 2018

(65) Prior Publication Data

US 2020/0174899 A1 Jun. 4, 2020

(51) Int. Cl.
*G06F 11/00* (2006.01)
*G06F 11/20* (2006.01)
(Continued)

(52) U.S. Cl.
CPC ...... *G06F 11/2028* (2013.01); *H04L 41/0668* (2013.01); *H04L 41/0893* (2013.01);
(Continued)

(58) Field of Classification Search
CPC . G06F 11/1456; G06F 11/202; G06F 11/2033
See application file for complete search history.

(56) References Cited

U.S. PATENT DOCUMENTS 8,214,296 B2 7/2012 Frank et al.
2004/0215777 A1* 10/2004 Piet ..................... H04L 41/0806
709/226
(Continued)

OTHER PUBLICATIONS

Google Scholar/Patents—text refined (Year: 2020).*
Google Scholar/Patents—text refined (Year: 2021).*

*Primary Examiner* — Christopher S McCarthy
(74) *Attorney, Agent, or Firm* — Griffiths & Seaton PLLC

(57) ABSTRACT

A new approach to resiliency management is provided in a data center wherein servers are constructed dynamically, on-demand and based on workload requirements and a tenant's resiliency requirements by allocating resources from these pools. In this approach, a set of functionally-equivalent "interchangeable compute units" (ICUs) are composed of resources from resource pools that have been extended to include not only different resource types (CPU, memory, accelerators), but also resources of different specifications (specs) and flavors. As a workload is being processed, the health or status of the resources are monitored. Upon a performance issue or failure event, a resiliency manager can swap out a current ICU and replace it with a functionally-equivalent ICU. Preferably, individual ICUs are hosted on one of: resources of a same type each with different specifications, and resources of a same type and specification and different flavors. The approach enables failure independence in a disaggregated environment.

22 Claims, 11 Drawing Sheets

(51) Int. Cl.
*H04L 29/08* (2006.01)
*H04L 12/927* (2013.01)
*H04L 12/24* (2006.01)

(52) U.S. Cl.
CPC ........ *H04L 47/803* (2013.01); *H04L 67/1008* (2013.01); *H04L 67/1031* (2013.01); *H04L 67/1034* (2013.01); *G06F 2201/805* (2013.01)

(56) References Cited

U.S. PATENT DOCUMENTS

| | | |
|---|---|---|
| 2007/0043771 A1 | 2/2007 | Ludwig et al. |
| 2010/0257535 A1* | 10/2010 | Badovinatz ............ G06Q 10/06 718/104 |
| 2011/0289507 A1 | 11/2011 | Khan et al. |
| 2016/0299772 A1* | 10/2016 | Seenappa ................ G06F 11/16 |
| 2018/0157532 A1* | 6/2018 | Kumar ................. G06F 9/5061 |
| 2020/0019479 A1* | 1/2020 | Liu ..................... H04L 41/0886 |

* cited by examiner

BUILDING A HIGHLY-RESILIENT SYSTEM WITH FAILURE INDEPENDENCE IN A DISAGGREGATED COMPUTE ENVIRONMENT

BACKGROUND OF THE INVENTION

Technical Field

This present invention relates generally to data processing systems in a data center operating environment.

Background of the Related Art

Conventional data center architectures face many challenges including, without limitation, scalability, fault tolerance and energy efficiency. In computing networking, the notion of "resilience" refers to the ability to provide and maintain an acceptable level of service in the face of faults and challenges to normal operation. Threats and challenges for services can range from simple misconfiguration, to actual network attacks.

Data center performance also is impacted by the nature of the hardware systems that comprise the data center. Currently, hardware systems are prepackaged with a pre-defined number of CPUs and memory, and any extensions require adding additional memory and CPU. Moreover, to provide resilient solutions, typically it is necessary to create high availability (HA) clusters, which typically involve two or more physical servers. Preferably, such resilient systems are spread between different physical racks, and even more preferably between different data center buildings. An example service configuration for failure resistance might comprise two servers that are anti-collocated, are organized as a cluster, and that are configured in an active-passive configuration. In this approach, the passive server is in a stand-by state monitoring the active server; if the active server fails, the passive server takes over the functionality of the active server and itself becomes the active server.

While these approaches provide some advantages, these types of traditional systems do not adequately address component-level resiliency and failover. For example, and continuing with the above-identified example, when a CPU failure occurs on the primary server, then the entire server is considered to be failed-over, in which case there may be significant downtime or interruption expected while the passive server takes over responsibility. Further, this scenario can lead to loss of data in memory and other interruption, in the latter case because contents on the passive node need to re-read the contents in its memory. Such component-level resiliency typically is not achievable in traditional bare-metal server environments, where resources are bound to a box physically. In particular, when the primary server has a failure, then the entire server will go down and the application is failed over onto the secondary (passive) server.

Given that current systems typically are built as hard-wired-configured servers, conventional methods to augment resiliency typically are software methods. For example, high-end mainframe computing systems often contain various mechanisms to provide resiliency, but these approaches are simply pre-built in the system and thus cannot be used "on-demand." This increases the overall expense of the system, especially given that resiliency may not be needed very often, or if resiliency is needed only on-demand for particular workloads. These systems thus are costly, and the desirable resiliency features cannot be added or removed at times as operations may require.

Other known approaches (e.g., SLA systems) to providing for resiliency are built in a way to be cost conscious, or to achieve optimized load balancing and optimal utilization of the data center operation utilization. As noted, however, these known hardware approaches do not provide adequately for component-level resiliency, and such systems do not always provide a consistent level of resiliency across workloads, which can be problematic if a workload is mission-critical.

More generally, redundancy is the cornerstone of many resiliency solutions, but the usefulness of redundancy is limited if all the redundant units expose the same type of faults or vulnerabilities. For this reason, the notion of failure independence of redundant units is important for maximizing the benefits of redundancy. Failure independence can be achieved if the redundant units have sufficient diversity that reduces the likelihood that the redundant units expose the same type of faults.

Previous attempts at building or automatically generating diverse redundant units of hardware or software was expensive, and they have had only limited success. For example, N-version programming was proposed to gain diversity at the software level. Its benefits, however, are limited in practice, as it has been shown that the premise of failure independence in N-version programs are not statistically true. Moreover, implementing N-version programming is usually time-consuming, costly, and it places significant additional requirements (e.g., N independent teams developing code from a single specification). Due to such factors, N-version programming may be impractical for all but the most critical of applications.

There remains a need to generate redundant hardware and software units that exhibit a high degree of failure independence, e.g., in a data center environment.

BRIEF SUMMARY

A new approach to resiliency management is provided in a data center wherein servers are constructed dynamically, on-demand and based on workload requirements and a tenant's resiliency requirements by allocating resources from these pools. In this approach, a set of functionally-equivalent "interchangeable compute units" (ICUs) are composed of resources from resource pools that have been extended to include not only different resource types (CPU, memory, accelerators), but also resources of different specifications (specs) and flavors. As a workload is being processed, the health or status of the resources are monitored. Upon a performance issue or failure event, a resiliency manager can swap out a current ICU and replace it with a functionally-equivalent ICU. Preferably, individual ICUs are hosted on one of: resources of a same type each with different specifications, and resources of a same type and specification and different flavors. The approach enables failure independence in a disaggregated environment.

According to a first embodiment, a method for assigning resources in a compute environment begins by providing a set of server resource pools. A server resource pool comprises a set of resources of: a type, a specification and a flavor. In response to receipt of data indicating a resiliency requirement, a set of interchangeable compute units (ICUs) are defined. With respect to the resiliency requirement, each ICU in the set is substantially functionally-equivalent. Further, each ICU is composed of resources drawn from the set of server resource pools, and a first ICU in the set has a different set of components than a second ICU in the set. As a workload is being processed, and responsive to receipt of an indication of a performance issue or failure associated with the first ICU being used to process the workload, the second ICU is then deployed to process the workload.

According to a second aspect of this disclosure, an apparatus for assigning resources in a compute environment is described. The apparatus comprises a set of one or more hardware processors, and computer memory holding computer program instructions executed by the hardware processors to perform a set of operations such as the steps described above.

According to a third aspect of this disclosure, a computer program product in a non-transitory computer readable medium for use in a data processing system for assigning resources in a compute environment is described. The computer program product holds computer program instructions executed in the data processing system and operative to perform operations such as the steps described above.

According to a fourth aspect of this disclosure, a data center facility is described. The data center comprises a set of server resource pools. For at least one resource type, the pools include a specifications pool, and a flavors pool. In this approach first and second computing units that are functionally-equivalent are hosted on one of: resources of a same type each with different specifications drawn from the specifications pools, and resources of a same type and specification and different flavors drawn from the flavors pool. The facility also includes a disaggregated compute system comprising resources selected from the set of server resource pools, the disaggregated compute system being configured to meet a resiliency requirement associated with a tenant. The data center also includes a resiliency manager executing in a hardware element and responsive to a failure in one or more resources in the disaggregated compute system as the tenant's workload is processed to selectively adjust a composition of the disaggregate compute system to maintain the resiliency requirement.

The techniques described herein provide significant advantages. By composing disaggregated system resources of different types, specs, and/or flavors into functionally-equivalent redundant units (namely, the ICUs), the resiliency manager achieves practical and highly-tunable levels of failure independence needed for creating highly resilient systems. The resiliency approach enables the generation of redundant hardware and software units that exhibit a high degree of failure independence in a disaggregated environment. As has been described, the solution described herein leverages elements in the design of disaggregated systems to enable a user to define redundant computing units with sufficient diversity to reduce the chance of simultaneous failures. The approach reduces the likelihood that the same vulnerability will be exposed on the redundant units. It provides for highly-resilient systems that exhibit failure independence in a disaggregated environment.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

By way of background, the techniques of this disclosure preferably are implemented within the context of a "disaggregated" compute system environment wherein a "disaggregated server"—sometimes referred to herein as a "server entity"—is composed or constitutes server resources selected from (or assigned from) shared server resource pools, namely, one or more of: a compute pool, a memory pool, an accelerator (e.g., GPU accelerator, network accelerator, etc.) pool, a storage pool, and so forth. As will be described in more detail below, these resource pools are augmented to include not only different resources types (CPU, memory, etc.), but also to include resources (of the same type) with different specifications (or so-called "specs") or flavors. A "spec" or "flavor" may be hardware-based, software-based, or some combination. In the context of software, typically a flavor corresponds to a "release" or "version." As will be seen, the technique of this disclosure leverages resources of varying types, specs and/or flavors to enables functionally-equivalent redundant units (referred to herein as "interchangeable compute units") to be constructed and used in the data center to provide for highly-tunable levels of failure independence.

The following sections provide basic background on known disaggregated compute systems (i.e., systems that do not provide the additional resource pools).

Disaggregated Computing Systems

As the nomenclature suggests, a "compute" pool typically constitutes physical processors (such as CPUs), a "memory"

pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

A disaggregated compute system in which the teachings of this disclosure are practiced typically utilizes optical interconnects for memory, although this is not a limitation.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

Optically-Connected Memory Architecture

By way of background, but not by way of limitation, the following describes a representative computer environment in which the techniques of this disclosure (described below) may be practiced.

Figure 1:
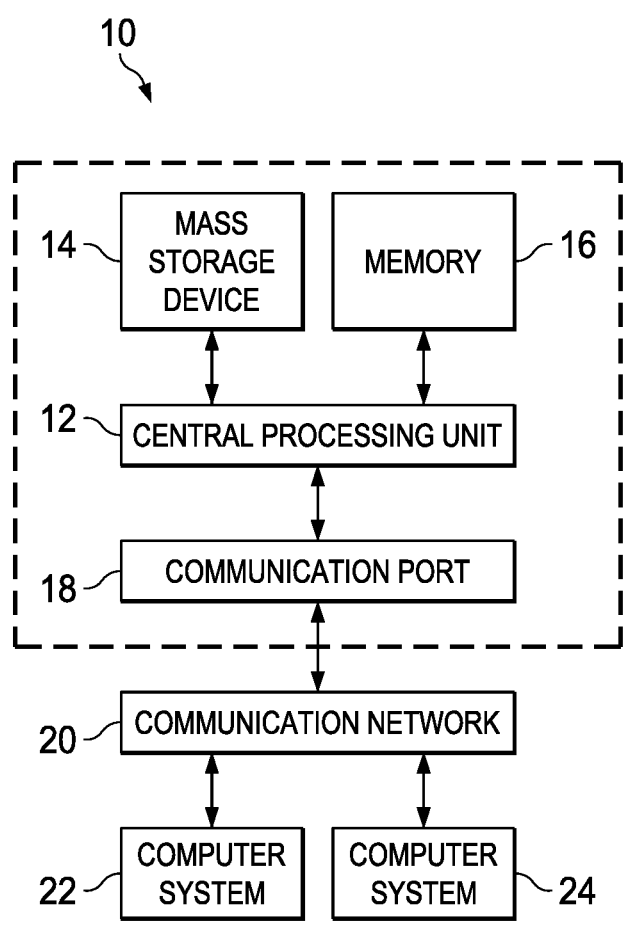
FIG. 1 depicts an exemplary block diagram illustrating a computing system environment in which exemplary aspects of the disclosure may be implemented.

Turning now to FIG. 1, exemplary architecture 10 of a computing environment in which the disaggregated compute system of this disclosure may be implemented is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
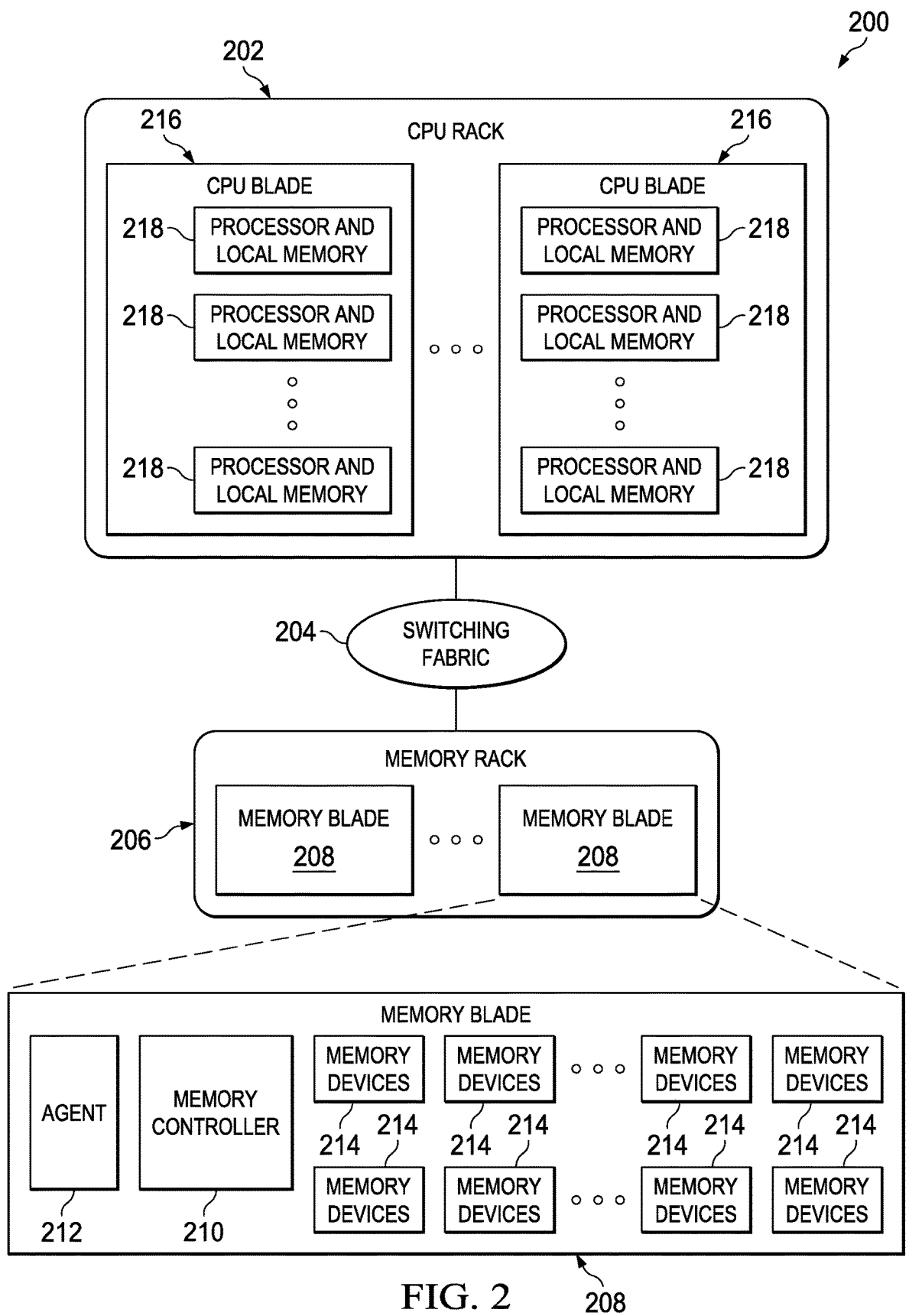
FIG. 2 is an exemplary block diagram of a hardware structure of an optically-connected memory system in which aspects of the illustrative embodiments may be implemented.

FIG. 2 is an exemplary block diagram 200 showing a hardware structure of an optically connected memory system in a computer system. The segregation of memory 214 from the CPU 218 through an optical interconnection fabric 204 is feasible due to the high bandwidth distance product of the optical link 204. In such an Optically-Connected Memory (OCM) system 200, the CPU 218 and memory 214 are organized into separate racks 202 and 208 connected through optical links and at least one switching fabric 204.

In the memory rack 206, memory blades 208 are arranged and communicatively coupled to other memory blades and a processor (CPU) rack 202. Each memory blade 208 houses multiple memory devices 214, an agent 212, and a memory controller 210. The CPU rack 202 includes processor blades 216 with each of the processor blades 216 communicatively coupled to other processor blades 216 and the memory rack 206. The processor blades 216 include processors 218, with each processor 218 containing local memory (not shown). The processors 218 (and respective physical computation nodes) inside a processor rack 216 are connected locally by a known fast interconnection means (not shown), which could be a direct connected network with some topology between the processors' 218 physical computation nodes within the processor blades 216, or a switch, through memory via a cache coherent symmetric multiprocessor (SMP) fabric, or a combination of the above. Each of the processors 218, processor blades 216, memory 214, and memory blades 208, share a number of optical external links. These external links are made for optimizing a point-to-point connection within the optical-switching fabric at very high bandwidth. This optimization may be in the physical implementation used, or in the protocol chosen to facilitate such high bandwidth, and preferably it has the ability to support memory switching within one physical link or multiple physical links to look like one high bandwidth physical link made of a few physical links. Because these external links typically are circuit-switched via at least one optical switch 204 that will not be aware of the data or content thereof, these should use a very lightweight communication protocol.

The physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. Preferably, and in the embodiment depicted, these external links are common to all memory blades and processor blades.

In the preferred architecture, at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used in the protocol chosen to facilitate such high bandwidth and has the ability to support aggregation of multiple streams within one physical link or multiple physical links to look like one high bandwidth physical link made of a few physical links. Because these external links are circuit switched via an all optical switch that will not be aware of the protocol, data or content thereof, a very light weight communication protocol is used. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect, in the optics domain, the light beams within these external links regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links (not shown) and the dynamic switching enable very high throughput (e.g., high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

The optically-connected memory architecture 200 engenders numerous benefits: (a) transparent memory capacity changes across the system nodes, (b) eliminate notion of worst-case provisioning of memories and allow the applications to vary memory footprints depending on the workloads, and (c) decouple the CPU downtime from the memory module failure, thus increasing the CPU availability. As will be described below, an architecture for memory management techniques is provided. As shown in FIG. 2, the processor blades 202 host a number of processors 218, whereas the memory modules 241 are packed (e.g., arranged) in the memory blades 208. The processor blades 216 and memory blades 208 are organized in separate racks 202 and 206, which are interconnected through an optical switching fabric 204. Each of the processors 218 in the CPU blade 202 may have a local memory pool 310a-n, which is used for faster memory accesses. A memory blade 208 can integrate, in addition to dynamic random-access memory (DRAM) memory devices, alternate memory devices, such as Flash or phase-change-memory, without any changes to the CPU blades 216.

Figure 3:
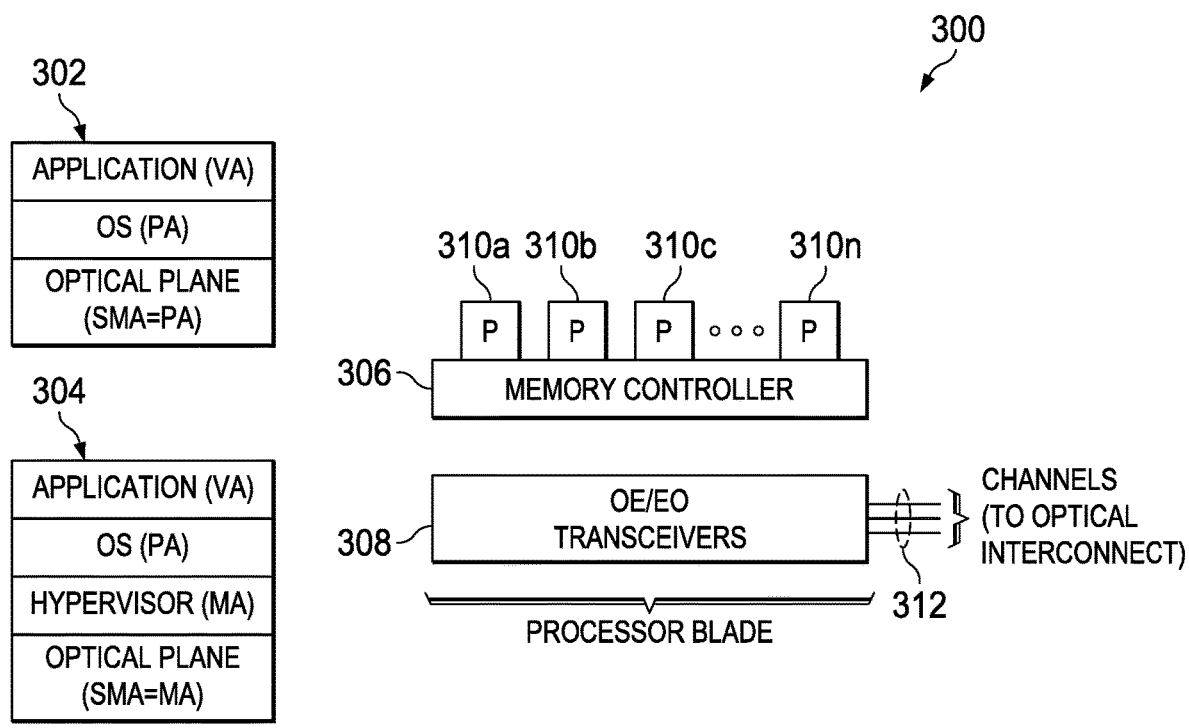
FIG. 3 depicts a block diagram illustrating a hardware structure of a processor design in the optically-connected memory system in FIG. 2.
Figure 4:
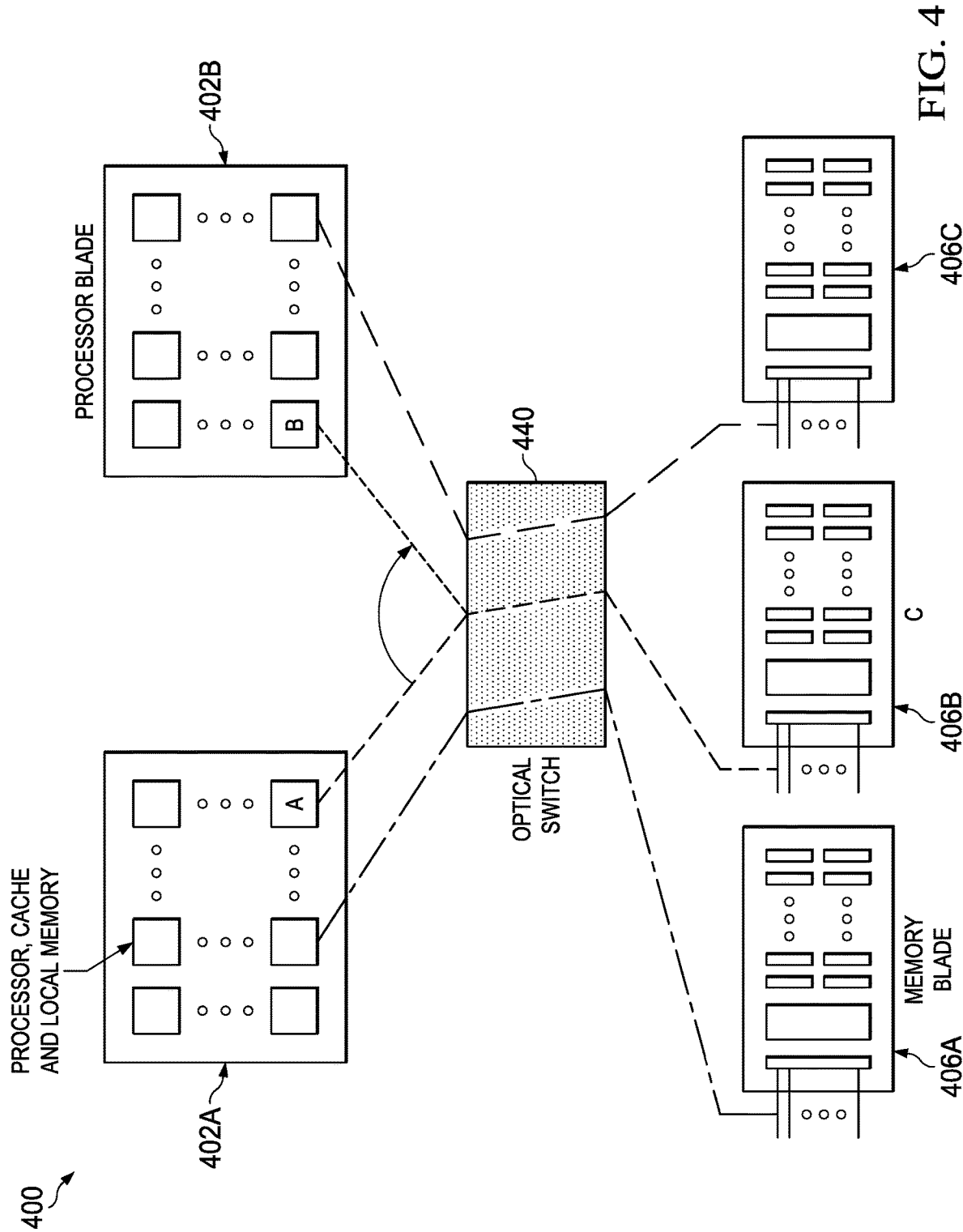
FIG. 4 is a block diagram illustrating a hardware structure for accessing memory at the processor.

Turning now to FIG. 3, FIG. 3 is a block diagram 300 showing a hardware structure of a processor design in the optically-connected memory system in a computer system. As illustrated in FIG. 3, the processor side design 300 illustrates: software stack in system (without virtualization) 302 and 304 (with virtualization), and the processor blade communicates with remote memory blades through optical transceiver 308 and 312. There is a memory controller 306 associated with local memory pool 310a-n. If a System Memory Address (SMA) space (as shown in 302 and 304 of FIG. 3) is above a certain, predefined limit, the SMA is mapped to a Remote Memory Address (RMMA) space 408 (as shown in FIG. 4) and the access request is routed to the remote memory blade through the proper channels. It should be noted that the memory blade 208 (see FIG. 2) maintains a separate address space called Remote Memory Address (RMMA) space.

In an optically-connected memory system (see FIG. 2 200), each processor node 218 maintains, for both remote and local memory, the SMA space. The processor node 218 maps the local physical memory to the lower portion of this address space. The remote memory is mapped to the available (i.e., higher) SMA address space (shown in 302 and 304). At the remote memory side, the memory blade 208 maintains the RMMA. Therefore, each memory access at the processor side should first be mapped to the SMA space (as shown in 302 and 304 of FIG. 3). If the SMA (as shown in 302 and 304) corresponds to the remote memory, the SMA (as shown in 302 and 304 of FIG. 3) is mapped to the RMMA, and this RMMA is sent to the remote memory blade 208. The optical plane translates the SMA (as shown in 302 and 304 of FIG. 3) to the respective RMMA and interacts with the remote memory, as illustrated in FIG. 3.

The processor blade (as shown with components 306, 308, and 310a-n in FIG. 3) connects to the remote memory through Electrical-to-Optical (EO)/Optical-to-Electrical (OE) transceivers 312 which are connected to, for example, a Northbridge™ chipset. Note that in a virtualized system the SMA (as shown in 302 and 304 of FIG. 3) corresponds to the Machine Address (MA) (as shown in 302 and 304), and in a system without virtualization the SMA (as shown in 302 and 304 in FIG. 3) corresponds to the physical address (PA) (as shown in 302 and 304 of FIG. 3). As shown in the FIG. 3, each processor blade (shown with components 306, 308, and 310a-n) may have simultaneous connections to multiple memory blades through separate channels. Here, in case of a single-mode optical fiber, a channel corresponds to a separate optical transceiver, whereas with wavelength-division multiplexing (WDM) a single transceiver may provide multiple channels.

In an optically-connected system (as seen in FIG. 2 200), processor nodes access remote memories through independent circuits established between the processor nodes and the remote memory blades. Turning now to FIG. 4, an exemplary block diagram 400 showing a hardware structure for switching memory through an optical interconnection fabric in a computer system is depicted. Processor B 402B establishes a circuit with the remote blade C 406B and gains access to the data previously held by processor A 402A. As outlined above in FIG. 2-4, a processor node has multiple channels to the remote memory blades; also, each of the memory blades is equipped with multiple channels, enabling the memory blades to be shared across multiple processor nodes. The optical channels (in a memory blade or a processor node) are provided by one or more optical transceivers. A processor node 402 (shown as 402A and 402B) can allocate memory from a remote memory blade by initiating a circuit with the memory blade 406 (shown as 406A-C) and sending the memory request to the remote memory controller. In such a memory system, a processor node 402 holding super pages within a remote memory blade can signal another processor to establish a circuit with the remote memory blade 406 (shown as 406A-C) initiating a transfer of memory space to the latter processor node. The former processor node (e.g., processor A 402A) can send the RMMA address space to the receiving processor node (e.g., processor B 402B), which can access the same data resident on the supplied address space. The sending processor may tear down (e.g., disconnect) the circuit with the remote memory blade 406 (shown as 406A-C) if it no longer requires any super pages at that memory blade (e.g., memory blade 406B). Such a process of transferring address space across processor nodes is referred to as memory switching. The memory switching process is shown in FIG. 4, where a processor node A 402A sends data stored in a remote memory blade C 406 to a processor node B 402B. The processor B 402B initiates a circuit with the remote memory blade C 406. Note that as a memory blade 406 may have multiple channels, the memory space of the memory blade 406 may be shared across multiple processor nodes, each memory space occupying a non-overlapping portion of the total space within the memory blade 406. Also, the source and destination side of memory switching may be referred to as switch-out and switch-in operations, respectively.

While the above-described compute environment is preferred, it is not intended to be limiting. Aspects of the disaggregated compute system of this disclosure may be implemented in a data center that provides a conventional cloud computing model of service delivery. Thus, for completeness, the following section provides additional details regarding cloud computing.

Cloud Computing

Cloud computing enables convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A typical cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 5:
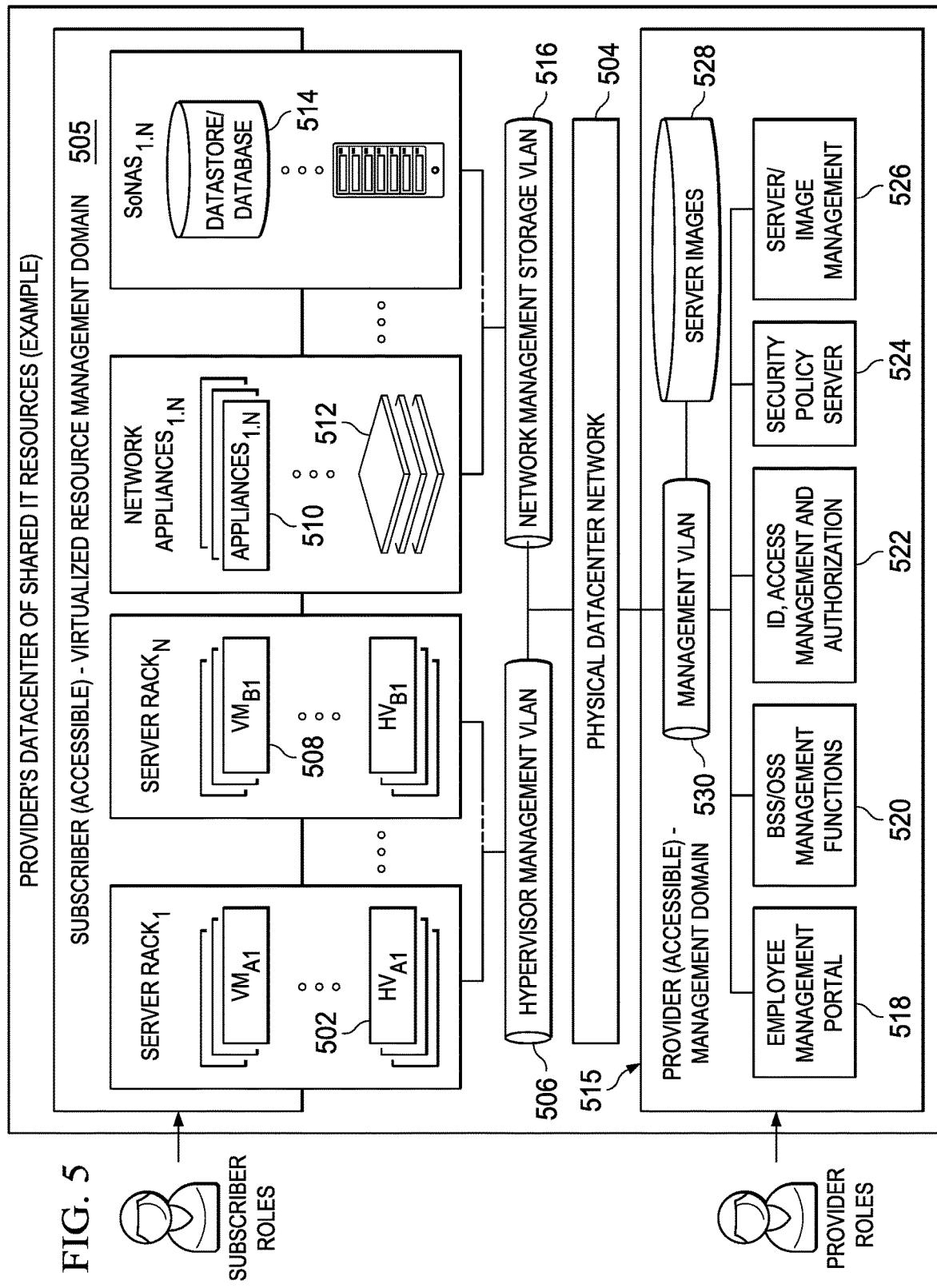
FIG. 5 depicts a disaggregated compute system according to this disclosure.

FIG. 5 illustrates a typical IT infrastructure that supports virtualization of resources and in which the below-described techniques of this disclosure also may be implemented in whole or in part. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 5, an example virtual machine hosting environment (alternately referred to herein as a data center or "cloud") is illustrated. This environment comprises host machines (HVs) 502 (e.g., servers or like physical machine computing devices) connected to a physical datacenter network 504, typically via a hypervisor management VLAN 506. Although not depicted explicitly, typically the environment also includes load balancers, network data switches (e.g., top-of-rack switches), firewalls, and the like. As shown in FIG. 5, physical servers 502 are each adapted to dynamically provide one or more virtual machines (VMs) 508 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 510 are hosted in network appliances 512, and tenant data is stored in data stores and databases 514. The applications and data stores are connected to the physical datacenter network 504, typically via a network management/storage VLAN 516. Collectively, the virtual machines, applications and tenant data represent a subscriber-accessible virtualized resource management domain 505.

Through this domain, the subscriber's employees may access and manage (using various role-based privileges) virtualized resources they have been allocated by the provider and that are backed by physical IT infrastructure. The bottom portion of the infrastructure illustrates a provider-accessible management domain 515. This domain comprises a provider employee management portal 518, the BSS/OSS management functions 520, various identity and access management functions 522, a security policy server 524, and management functions 526 to manage the server images 528. These functions interface to the physical datacenter network via a management VLAN 530. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

Disaggregated Computing Systems with Basic Resiliency Management

The following section provides additional background on a disaggregate compute system environment that includes resiliency management.

Such techniques may be implemented within a hardware cloud environment, such as a disaggregated compute system wherein server resources in or across the data center are "disaggregated" into shared server resource pools, namely, one or more of: a compute pool, a memory pool, an accelerator pool, a storage pool, and the like. Servers are constructed dynamically, for example, on-demand and based on workload requirements, by allocating from these resource pools. A disaggregated compute system of this type keeps track of resources that are available in the shared server resource pools, and manages those resources based on that information.

Figure 6:
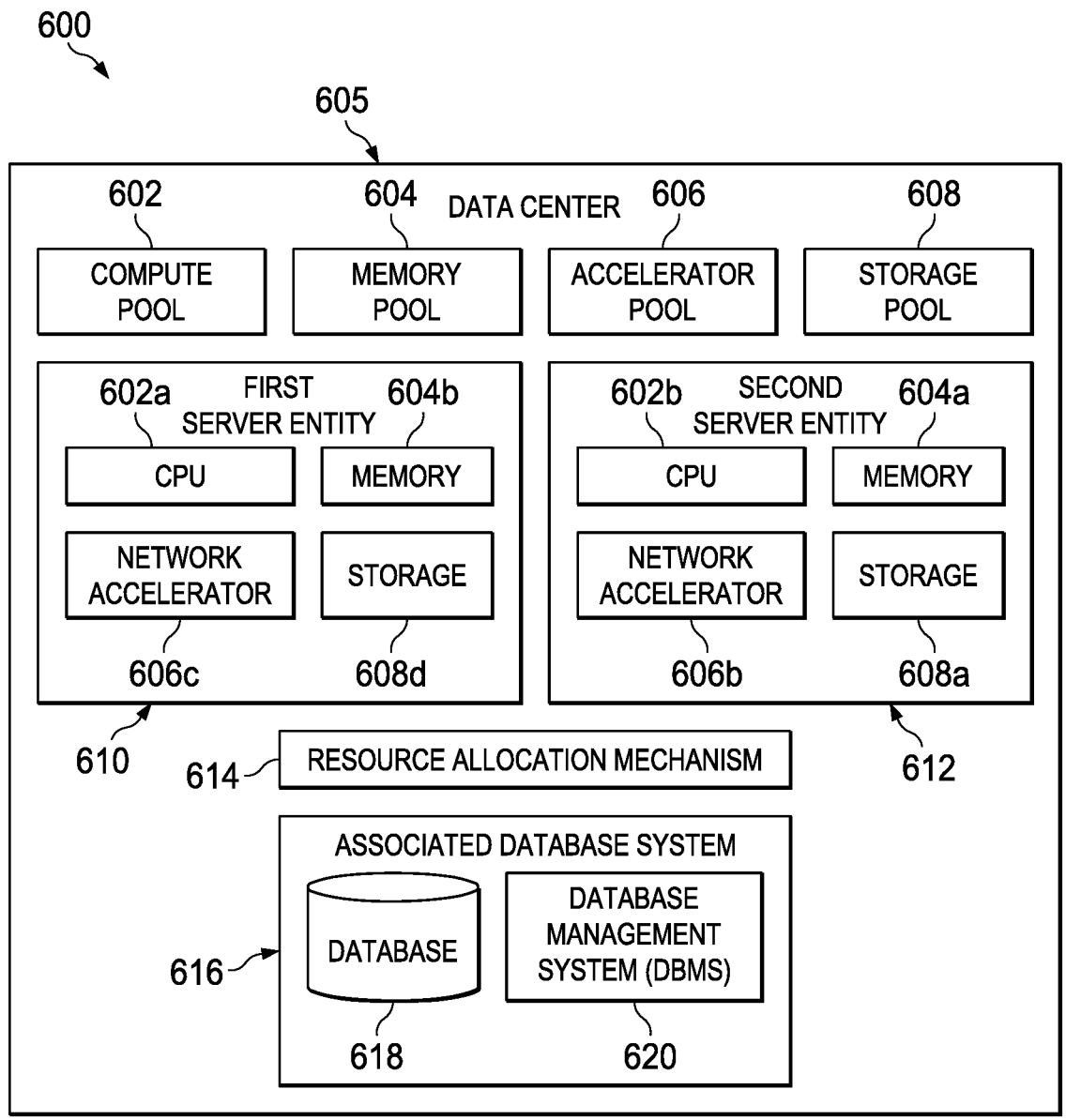
FIG. 6 depicts an alternative data center architecture in which the techniques of this disclosure may be implemented.

A representative disaggregated compute system 600 is shown with reference now to FIG. 6. In one embodiment, the disaggregated compute system 600 is configured within a data center 605 in which a switching optically-connected memory architecture is used. This architecture was described above in the context of FIGS. 1-4, but it is not intended to be limiting. In the disaggregated compute system 600, there are shared server pools, e.g., a compute pool 602, a memory pool 604, an accelerator pool 606, a storage pool 608, and perhaps others. There may be a single instance of a resource pool, or multiple such instances (sometimes referred to as "multiple pools"). In the approach, particular servers that service customer workloads are constructed dynamically, for example, on-demand and based on workload requirements, by allocating from these resource pools. Thus, for example, a first server entity 610 may comprise CPU 602a (selected or otherwise obtained from compute pool 602), memory 604b (selected or otherwise obtained from memory pool 604), accelerator 606c (selected or otherwise obtained from accelerator pool 606), and storage 608d (selected or otherwise obtained from storage pool 608). A second server entity 612 may comprise CPU 602b, memory 604a, accelerator 606b and storage 608a. These examples are merely representative. The particular server pool resources that comprise a given server entity may change.

Preferably, once a particular resource of a resource pool is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, the disaggregated compute system 600 has the capability to keep track of resources that are available in the shared server resource pools and that are allocated or de-allocated to the various server entities. To this end, the disaggregated compute system 600 comprises (or has associated therewith) a tracking system comprising a resource allocation mechanism 614, and an associated database system 616. Generally, the tracking system is implemented as a data processing system, and it may operate in a standalone manner or as a component of some other system or functionality in the data center.

Typically, the resource allocation mechanism 614 is implemented in software, namely, as set of computer program instructions, executing in one or more hardware processors. The resource allocation mechanism 614 may comprise one or more sub-systems or modules, processes, programs or execution threads, and such components may be co-located or distributed. The resource allocation mechanism 614 generally is responsible for executing one or more allocation algorithms that create and manage server entities. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources to the existing server entity when less capacity is needed to handle the workload. One or more of such functions may be combined, and other types of algorithms may be implemented by the resource allocation mechanism 614.

The one or more algorithms that comprise the resource allocation mechanism 614 used information stored in the database system 616 to carry out the management functions. As noted above, the database system 616 stores information that tracks the state, status or other properties and attributes of the various resources in the shared server pools. In addition, preferably the database stores information about each server entity built by the resource allocation mechanism. Generalizing, and as well-known, the database system 616 comprises a database 618, namely, a collection of data organized in one or more ways (e.g., via schemas, tables, queries, report, views and other objects), together with a database management system (DBMS) 620, which is a computer software application that interacts with the user, other applications, and the database to capture and analyze data. A general purpose DBMS enables the definition, creation, querying, update and administration of databases. A representative DBMS is IBM® DB2®.

In one embodiment, the database 618 is relational. The database stores a data record (or, more generally, a data set) that, for each defined server entity, identifies the resources that comprise the server. Preferably, the data record is associated with an identifier, a unique server ID, and each resource the comprises the server is associated in the database with that unique server identifier. Thus, continuing with the example described above, the first server entity 610 may be associated with unique server $ID_1$, while the second server 612 may be associated with user server $ID_2$, and so forth.

Preferably, the individual components of the resource pools also include identifiers that are tracked in the database; when a resource is allocated to a server entity, the resource's identifier then gets associated with (cross-referenced to) the server entity. Thus, continuing with the first example above, the various resource-specific identifiers for the CPU 602a, memory 604b, GPU accelerator 606c and storage 608d are associated (by relational tables or otherwise) with unique server ID1, which is the unique server identifier for the first server entity 610. Likewise, and continuing with the second example, the various resource-specific identifiers for the CPU 602b, memory 604a, GPU accelerator 606b and storage 610a are associated with unique server ID2, which is the unique server identifier for the second server entity, and so forth for each server entity.

When the server entity is first built, it includes a set of one or more server pool resources selected from the server pools by the resource allocation mechanism. Thus, the unique server identifier for the server entity will have an initial set of resource-specific identifiers associated therewith. As resources are later allocated or de-allocated from the server entity, the set of constituent resource identifiers associated with a particular server entity identifier thus changes as well.

There may be multiple instances of a resource pool. When multiple instances exist, particular resources to support the server entity are then selected from one or more of those instances. Preferably, if resources assigned to a first instance of a resource pool are used to build the server entity, when it becomes necessary to add capacity to that server entity, preferably the additional resources are also drawn from the same instance where possible.

Preferably, the resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

Although a relational database is useful for implementation, the server entity identifiers and resource-specific identifiers may be related to one another in other ways, e.g., as linked lists, data arrays, hash tables, or otherwise.

In general, the resource allocation mechanism 614 and the database system 616 work together to manage the disaggregated compute system. The resource allocation mechanism functions as a tracking system that keeps track of idle and used CPUs, memory, GPU accelerator and other components that define a server. Additionally, the tracking system keeps a record for each defined server of what CPUs, memory, accelerator or other components are part of the server. As noted, and for the each defined server, a unique ID is specified, and the requested number of CPUs, memory and storage are selected from the pool of idle resources, e.g., based on their locality, best fit and future expansion needs as will be further described. The unique server ID, and also IDs of each of these resources, are recorded in the tracking system. Preferably, and as noted above, the used components are marked as used and are removed from the pool of idle components.

Preferably, each component of the server entity is tagged with the unique server ID with which it is a part. Thus, the component is made aware that it is a component of the server entity identified by the unique server ID.

Preferably, each request issued to the disaggregate compute system, as well as the data received in response to the request, also are tagged with the server entity ID. When, for example, the request is received at a resource, the resource then compares the server entity ID tagged to the request to the server entity ID for the resource. In other words, the component is provided with the capability to check if the request matches the server entity ID to which the component has been allocated. If so, the component recognizes the request as something that can be consumed and acted upon. When the server entity ID tagged to the request does not match the server entity ID tagged to the component, the component knows that the request can be ignored.

As further background, component-level resiliency within a disaggregated compute system environment may be implemented. In general, assume that a particular tenant in the disaggregated compute system environment has a resiliency requirement, which requirement typically is specified in or in association with a service level agreement (SLA) held by the tenant. The tenant's particular resiliency requirement need not be specified in an SLA. In such instances, one or more default resiliency requirements may be specified or otherwise configured in the data center. Typically, particular tenants in the data center environment may have different SLAs and thus differing resiliency requirements. A particular tenant's resiliency requirements as specified in the SLA or otherwise may depend on various factors, such as the type of tenant, the nature of the service(s) for which the tenant contracts, the type or types of workload(s) being processed, time-of-day, location, and others, as well as combinations of such factors. A tenant's particular resiliency requirement is assumed to be capable of being met by configuring one or more servers in the disaggregated compute system, and it is further assumed that each of the one or more servers are constructed statically or dynamically from the shared server resource pools. In this regard, and as described above, preferably the disaggregated compute system has a large pool of physical CPUs, and pool of accelerators and pool of memory, all preferably interconnected with high bandwidth, high performance optical interconnect. Thus, a "resilient" physical server created from resources in these resource pools comprises various components, e.g., CPU, memory and storage, etc., to provide the tenant a resilient system that will meet the tenant's resiliency requirements.

In one embodiment, physical components of a disaggregated system server are specified to build and maintain a resilient system for a tenant in or across a data center. Preferably, resiliency (and in particular a given resiliency requirement for a given tenant) is maintained by monitoring the health of components used in a system (e.g., for the tenant) and, as necessary, requesting and enabling a back-up component (as an active component) of that system. To this end, the disaggregated compute system includes (or has associated therewith) a "resiliency manager" (RM) function that tracks occupied and idle hardware components, monitors the health of the components, and selectively enables the backup components, e.g., in the case of a failure of one of the components of the system. The resiliency manager function typically operates on a per-tenant basis, but this is not a requirement or limitation. Generally, the resiliency manager is operative to build and maintain a resilient system, preferably based on locality of the resources and level of resiliency needed to meet the tenant SLA (or some other criteria). As noted above, typically the level of resiliency correlates with the tenant's SLA, but this is not necessarily a requirement.

A disaggregated compute system that includes the resiliency manager function may be a standalone system, or it may be otherwise associated with a known SLA system solution. A "higher-level" SLA typically means that the system is build using more resilient approaches as compared to a relatively "lower-level" SLA. The resiliency manager function may be implemented with one or more components or systems, typically as a set of software components that operate in association with other disaggregated compute system operations or as adjunct thereto. In one embodiment, the resiliency manager comprises a set of components that perform separate operations, such as tracking, component health monitoring, and component failover processing (re-allocations).

By way of additional background, the disaggregated compute system may comprise multiple physical drawers, multiple physical racks, and multiple physical blocks (of resources). A CPU block (having multiple CPUs) may be allocated to one or more servers. Likewise, a memory block (having multiple memories) may be allocated to one or more servers. The level and type of resiliency provided will vary depending on configuration. For example, a multiple CPU block can be allocated to a server, with some of the CPU units in the block being "active" while others are "passive." As used herein, the terms "active" and "passive" are relative, but typically an "active" node or component refers to the primary processing/storage element, while typically a "passive" node or component refers to the backup processing/storage element. The terms "primary" and "secondary" are synonymous to active and passive, respectively. More generally, the active/primary may be considered the "first" server while the passive/secondary is considered a "second" server. Additionally, it is assumed possible to use two or more CPUs in a CPU block in an active-active configuration. Likewise, a memory block can be mirrored to a second memory block in the same memory pool (to provide an active-passive configuration), or a memory block can be mirrored to a memory block in a remote pool. Typically, a particular configuration (whether active or passive) is configured as a storage tuple (e.g., mirrored storage, multiple processor—memory block—SSD).

As noted above, preferably the resiliency manager is operative to track the servers in the disaggregate compute system that are configured with the resiliency capability. In addition, the resiliency manager tracks the components of each such server and how those components are arranged, so that the compute resources tied to a primary server can be associated with a secondary server. The resiliency manager's basic operation is to take this data (which may be maintained in a separate tracking system) and to manage the association of the resources appropriately for the primary and secondary server. Then, when a particular first component fails (e.g., a CPU on the primary server), the resiliency manager can take an appropriate first component-level action (e.g., link a component on the secondary server to the memory of the primary server) to address the issue. In this manner, the resiliency manager addresses component-level failures that might otherwise impact the tenant's SLA. Preferably, the resiliency manager operates continuously to attempt to maintain the tenant's SLA. Thus, continuing with this example, when a particular second component fails (e.g., CPU failure on the primary server), the resiliency manager takes an appropriate second component-level action (e.g., link the CPU on the secondary server to the memory and storage on the primary server) to address the issue, and so on for additional component failures.

Generalizing, the resiliency manager operates to track components and their health, and it adjusts server resource configurations dynamically based on locality of the resources and level of resiliency required to maintain the SLA for each of one or more tenants in or across the data center. The notion of "maintaining" the SLA depends on context, and it does not necessarily imply that the resiliency manager operates to meet any absolute SLA constraint or requirement. Further, the resiliency manager may operate to adjust resource configurations across "active-active" configurations, or "active-passive" configurations, or otherwise.

Figure 7:
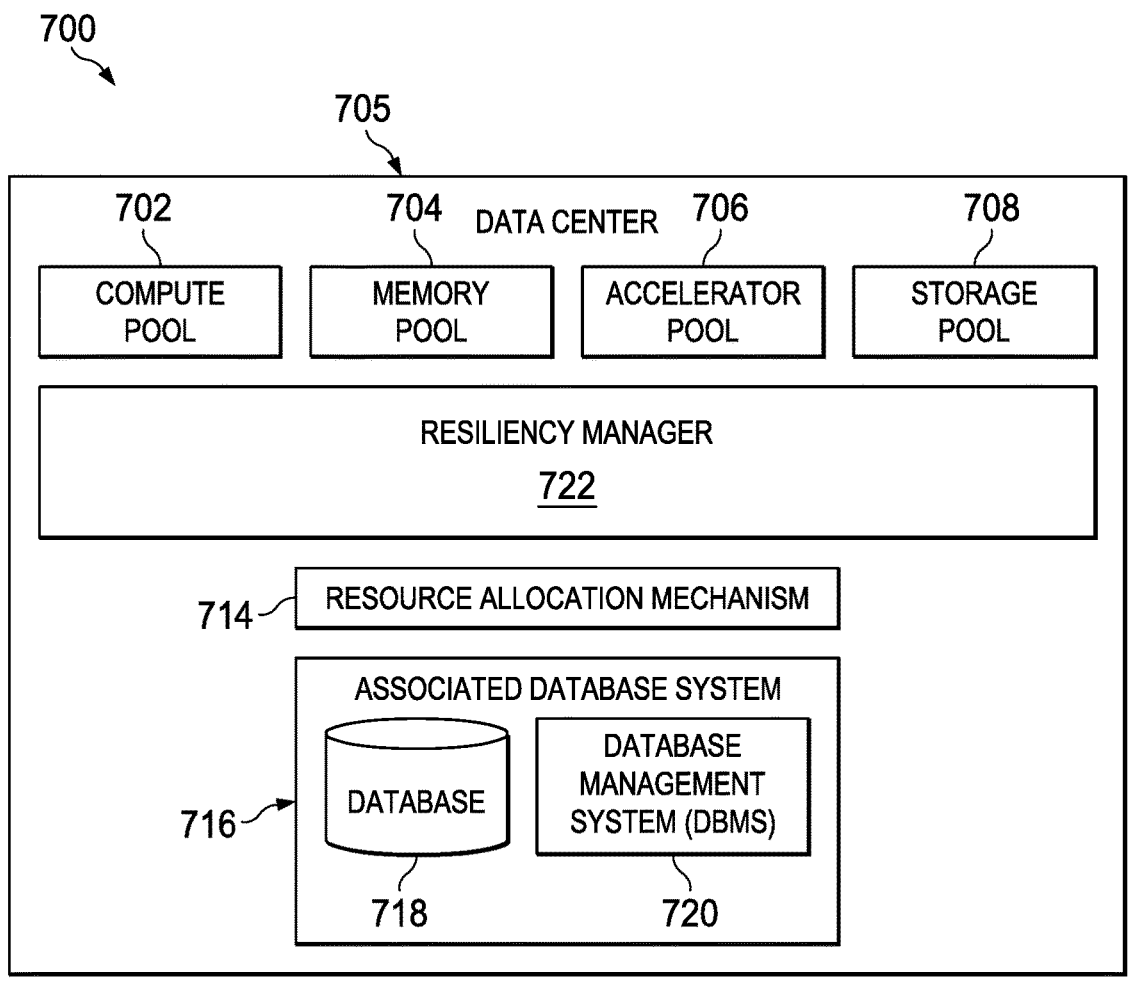
FIG. 7 depicts a data center architecture that includes a resiliency manager component.

FIG. 7 depicts an embodiment of a disaggregate compute system that includes the resiliency manager. As in FIG. 7, disaggregated compute system 700 is configured within a data center 705 in which a switching optically-connected memory architecture is used. In the disaggregated compute system 700, there are shared server pools, e.g., a compute pool 702, a memory pool 704, an accelerator pool 706, a storage pool 708, and perhaps others. As noted above, and to manage basic resource allocations and de-allocations, the disaggregated compute system 700 keeps track of resources that are available in the shared server resource pools and that are allocated or de-allocated to the various server entities. To this end, the disaggregated compute system 700 comprises (or has associated therewith) a tracking system comprising a resource allocation mechanism 714, and an associated database system 716. As previously described, the resource allocation mechanism 714 generally is responsible for executing one or more allocation algorithms that create and manage server entities. These algorithms use information stored in the database system 716 to carry out the management functions. As noted above, the database system 716 stores information that tracks the state, status or other properties and attributes of the various resources in the shared server pools. In addition, preferably the database stores information about each server entity built by the resource allocation mechanism. The database system 716 comprises a database 718 and a database management system (DBMS) 720. The database stores a data record (or, more generally, a data set) that, for each defined server entity, identifies the resources that comprise the server. Preferably, the data record is associated with an identifier, a unique server ID, and each resource the comprises the server is associated in the database with that unique server identifier. Additionally, the database system 716 comprises a data record associated with the SLA and resiliency requirements at a per-tenant or per-server level.

As noted, the disaggregate compute system 700 also includes a resiliency manager 722 that, as noted, tracks occupied and idle hardware components, monitors the health of the components, and selectively enables the backup components, e.g., in the case of a failure of one of the components of the system. To this end, typically the resiliency manager works in conjunction with the resource allocation mechanism 714, and it uses the server and resource identifier information that is maintained in the database system 716. The resiliency manager 722 functions may be built into the resource allocation mechanism. As noted above, the resiliency manager (or one or more functions thereof) may be implemented on one or more software systems, on co-located or distinct machines, or through use of other systems and services in the data center environment.

For example, the resiliency manager may utilize a component monitoring function provided by IBM® Systems Director, a unified systems management platform that provides tools for discovery, inventory, status, configuration, system health, resource monitoring, system updates, event notification and management automation in a data center environment. As noted above, the particular implementation of the resiliency manager is not a limitation of this disclosure.

The resiliency manager may be configured to operate with respect to certain component failures, or failures of different component types. The resiliency manager may have one or more default resiliency settings for each type of component, or particular resiliency settings may be customized for each type of component. As noted above, according to the basic operation, a particular tenant will have associated therewith a resiliency requirement (specified generally, or perhaps per component-type), and the resiliency manager operates continuously as the tenant's workload is processed to adjust the components in the server as and when components fail to ensure that the resiliency requirement continues to be met. In this manner, the resiliency manager advantageously provides for component-level resiliency within the data center environment.

The technique so far described provides a method for specifying a highly resilient system in a disaggregated cloud environment. The method includes providing resource pools from which servers of the disaggregate compute system are built. For a given tenant having a SLA, resources from each of the pools are selected to meet a resiliency requirement for a server entity that is assigned to the tenant. As the tenant's workload is being processed, the health of the selected resources is monitored. In response to a change in health of the resources (e.g., a CPU failure, a memory failure, or the like), other resources from the pools are then selected for the server to that the resiliency requirement continues to be maintained. The other resources may be those that have been pre-selected for use and whose operating status is changed (e.g., from "passive" or "standby" to "active") on-demand and as needed to continue to meet the resiliency requirement. Thus, according to this disclosure, the various components that comprise a server may vary as one or more components fail.

The notion of "failure" here may be a relative term instead of requiring some absolute failure mode. Thus, a particular component may be deemed to have failed when its operating characteristic(s) fall below some configurable threshold for performance, reliability, latency or other factor.

Further, the notion of "maintaining" the resiliency requirement for a given tenant as components fail and the resiliency manager adjusts the server entity accordingly is not necessarily an absolute requirement. Thus, the resiliency manager can be said to maintain the resiliency requirement when the newly-constituted server entity (or some new server entity) is within a configurable threshold associated with the resiliency requirement. Also, "maintaining" the resiliency requirement may also be satisfied by attempting to maintain that requirement to some configurable degree.

Moreover, the notion of a "composition" of a server entity being changed by the resiliency manager may refer to the promotion of a standby component to replace a failed component, whether or not the standby component is from the server entity, or some other server entity. As noted above, a standby component may be promoted to take over for a failed component even if the standby component is being used at the time to handle some other workload (either of the tenant, or some other tenant).

Highly-Resilient Systems with Failure Independence Using Interchangeable Compute Units The above-described technique provides focuses on component level resiliency. According to this disclosure, the technique is enhanced to provide resiliency at a much higher (finer) degree of granularity, namely, by implementing functionally-equivalent redundant units that are composed of resources from resource pools that have been extended to include not only different resource types (CPU, memory, accelerators), but also resources of different specs and flavors. As noted above, these functionally-equivalent redundant units are referred to herein as "interchangeable compute units" or "ICUs," as they are composed of compute resources from the (extended) resource pools. These interchangeable compute units extend the notion of resource pools in disaggregated systems to provide for practical and flexible failure independence and, in particular, through diversity in redundancy. As noted above a "spec" or "flavor" may be hardware-based, software-based, or some combination. An example of a hardware spec for a CPU type might then be Power CPU versus x86 CPU. An example of a hardware flavor might then be an ARMv7-A processor versus an ARMv7-R processor. In the context of software, typically a flavor corresponds to a "release" or "version." As will be seen, the technique of this disclosure leverages resources of varying types, specs and/or flavors to enables the ICUs (or, more generally, the functionally-equivalent redundant units) to be constructed and used in the data center to provide for highly-tunable levels of failure independence.

Figure 8:
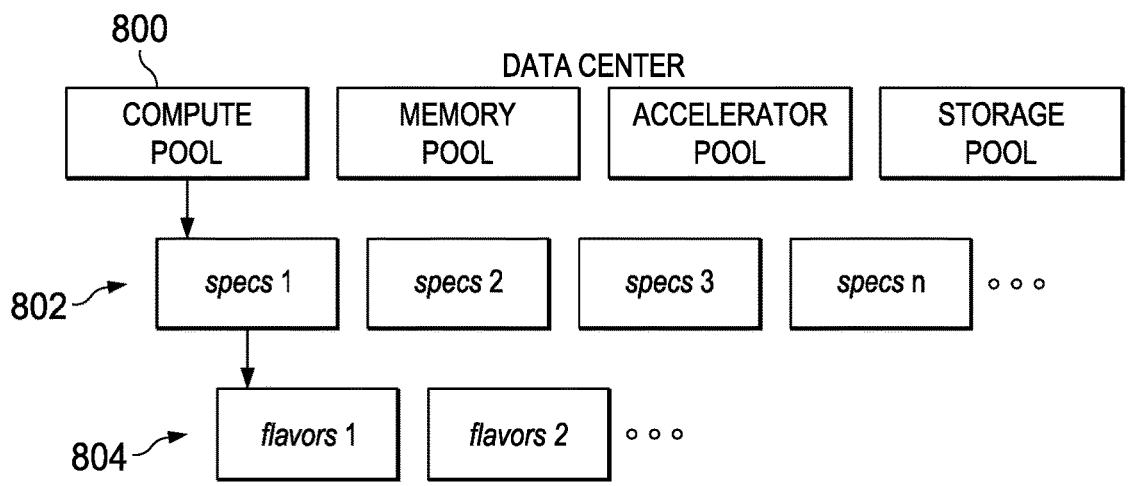
FIG. 8 depicts a representative set of resource pools from which resource specs and flavors may be drawn to compose a server entity that has a defined function.

According to the technique of this disclosure, components from various sources (e.g., vendors) at different levels of the IT stack (processor, memory, storage, operating system, middleware and application) are combined into the ICUs that are then managed by the resiliency manager, such as the resiliency manager described in association with FIG. 7. Specifically, the resource pools in the disaggregate compute environment are augmented to include the resource types, as well as resources of different specs and flavors. Thus, in addition to the resource pools shown in FIGS. 6 and 7, there may be additional resource pools corresponding to the specs and flavors. The particular manner in which the pools of resource types, specs and flavors are organized and managed may vary, and there is no particular requirement in this regard. By way of example, FIG. 8 depicts a representative set of such pools, which in this embodiment may be arranged and managed hierarchically. Thus, in this example, there are the usual resource pools 800 corresponding to type, and additional resource pools 802 and 804 corresponding to the specs and flavors. Typically, and as depicted, the spec pool 802 includes one or more specs per resource type, and typically the flavor pool 804 includes one or more flavors per spec. As will be appreciated, typically the different resource types have unrelated specs, whereas different flavors typically have related specs.

Once the pools are established, resources of different types, specs and/or flavors are then composed to build the ICUs. ICUs that represent functional equivalence may be aggregated into an "interchangeable computation set" or "ICS." Stated another way, an ICS comprises one or more ICUs that provide for functional equivalent operation (from a resiliency standpoint) although the individual ICUs of the ICS comprise different types, specs and/or flavors as drawn from the resource pools. Thus, when an ICU of an ICS enters a failure mode, the resiliency can simply substitute another ICU of the ICS (or otherwise augment the existing ICU) without loss of service or data. This ICU approach thus provides for a high degree of failure independence that also leverages the key value proposition of the disaggregate system environment. In particular, the ICUs enable practical and highly tunable levels of failure independence to support a highly resilient system.

Figure 9:
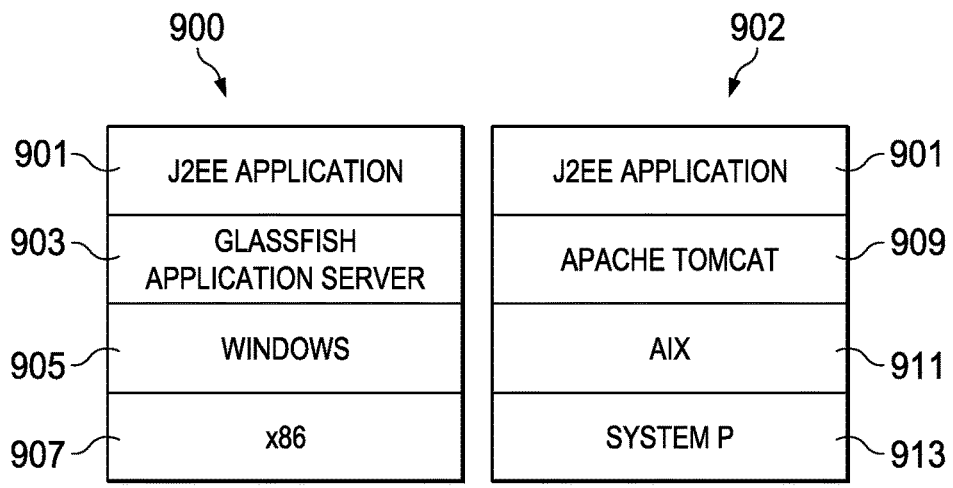
FIGS. 9-14 depict representative interchangeable compute units (ICUs) that may be composed according to the techniques herein.
Figure 10:
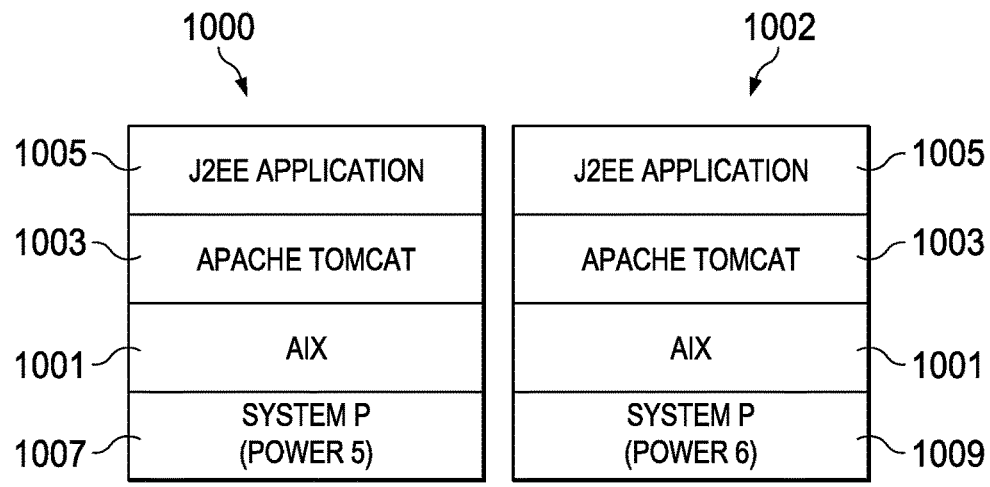
Figure 11:
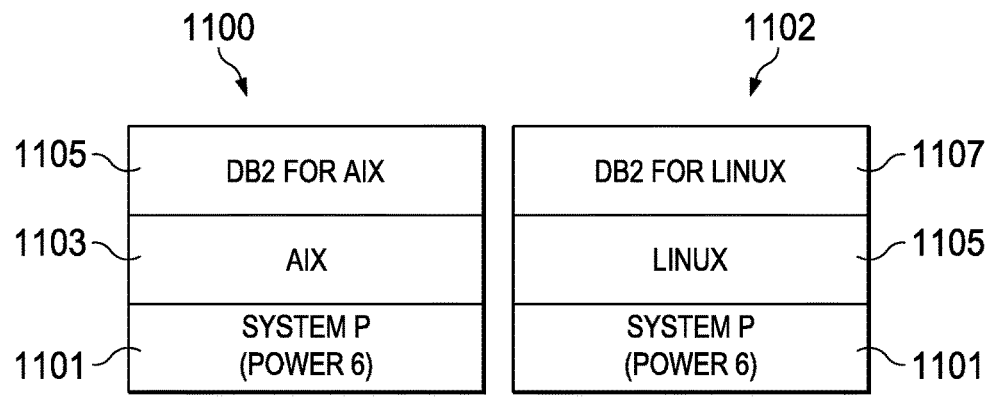
Figure 12:
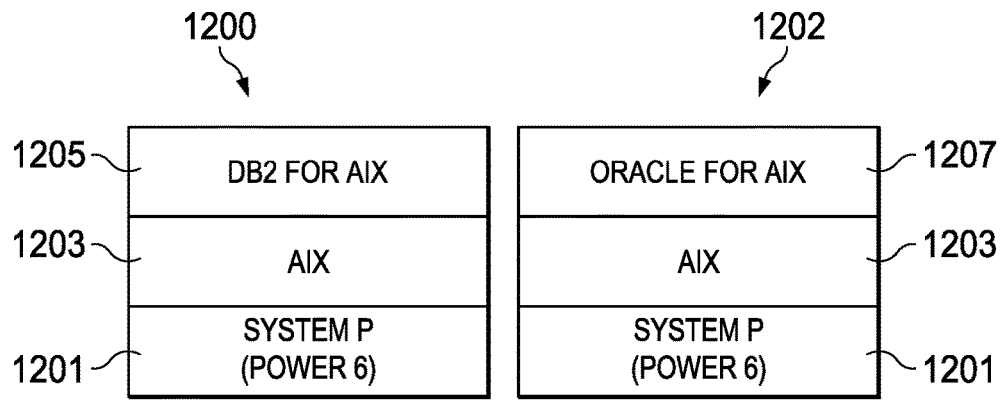

In a preferred embodiment, an ICS is a set of ICUs hosted on a resource of the same type, but wherein the resource type either has different specs or the same spec but different flavor. The complexity of an ICS may vary across a diversity spectrum, as can be seen by way of example. Thus, FIG. 9 depicts one end of the diversity spectrum, wherein two ICUs 900 and 902 in a given ICS have completely different processors, operating systems, middleware, and even application software. For example, ICU1 900 is a computing entity composed of a J2EE application 901 running on a Glassfish Application Server 903 hosted on a Windows server 905 running on a x86 processor 907. In contrast, ICU2 902 is composed of a J2EE application 901 running on an Apache Tomcat application server 909 hosted on AIX machine 911 running on a Power 8 Processor 913. FIG. 10 depicts an opposite end of the diversity spectrum, wherein two ICUs 1000 and 1002 in the ICS have the same operating system 1001, middleware 1003 and application software 1005, but different flavors of the same processor (Power 6 1007 instead of Power 5 1009). Of course, a skilled person will appreciate that there may be many possibilities between the two ends of the diversity spectrum. Thus, e.g., FIG. 11 depicts two ICUs 1100 and 1102 in a given ICS having the same flavor and type of processor (e.g., Power 6) 1101, different operating systems (AIX 1103 and Linux 1105), and the same middleware 1107 built for those operating systems (e.g., DB2 for AIX and DB2 for Linux). FIG. 12 depicts two ICUs 1200 and 1202 in a given ICS having the same flavor and type of processor 1201 (e.g., Power 6), the same operating systems 1203 (AIX), but different middleware of the same type 1205 and 1207 (e.g., DB2 for AIX and Oracle for AIX).

As the above examples illustrate, ICUs may be configured according to a diversity parameter. A higher diversity parameter results in ICUs with more diverse sets of components (see, e.g., FIG. 9), whereas a lower diversity parameter results in ICU with less diverse sets of components (see, e.g., FIG. 10). The examples in FIG. 11 and in FIG. 12 implement ICUs with intermediate levels of diversity of components. The resiliency manager may be configured to implement predetermined diversity parameters that may be then selected by the user during the configuration process to create more- or less-diverse ICUs, as the case may be.

Figure 13:
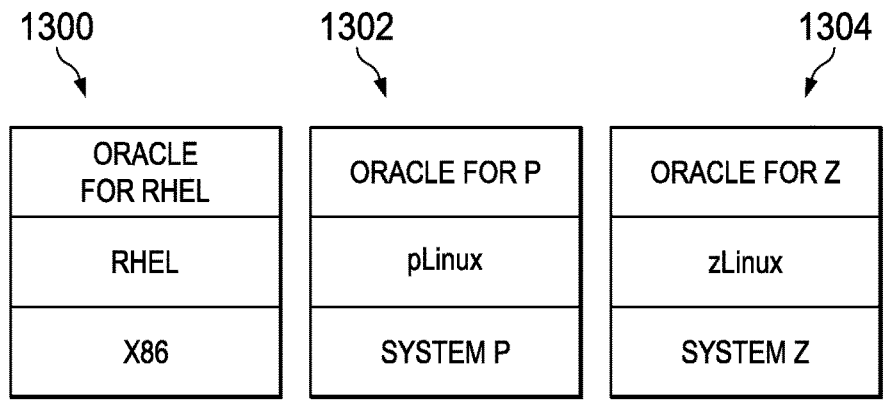
Figure 14:
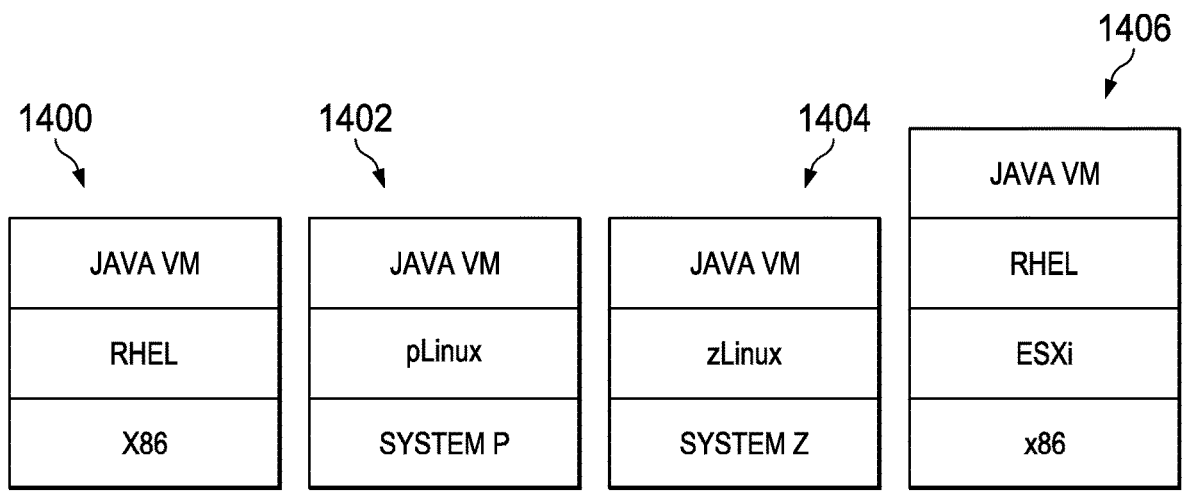

As further examples, FIG. 13 depicts a first ICS comprising three (3) ICUs 1300, 1302 and 1304 that provide for three functionally-equivalent instances of an Oracle DBMS. FIG. 14 depicts a second ICS comprising four (4) ICUs 1400, 1402, 1404 and 1406 that provide for four functionally-equivalent Java Virtual Machines (VMs) instances.

The above-described examples are not intended to limit the meaning of an ICU according to this disclosure.

Generalizing, a disaggregated system is characterized by resource pools for various resource types preferably all interconnected with a high bandwidth optical interconnect. As described, CPUs, accelerators, memory, disks, etc. are all different resource types.

Preferably, each type has its own distinct resource pool. For a given resource type, preferably there can be multiple specs and flavors, e.g., x86 CPUs and Power 7 CPUs are different specs of the same resource type, namely CPU. Resources of the same spec but different flavor typically are interchangeable at the OS level (e.g., ARMv8-R, ARMv7-A, ARMv7-R, ARMv7E-M, ARMv7-M, ARMv6-M are all based on the ARM spec), and are interchangeable for the same operating system. Preferably, each resource pool comprises a specific resource flavor of a specific resource type.

Figure 15:
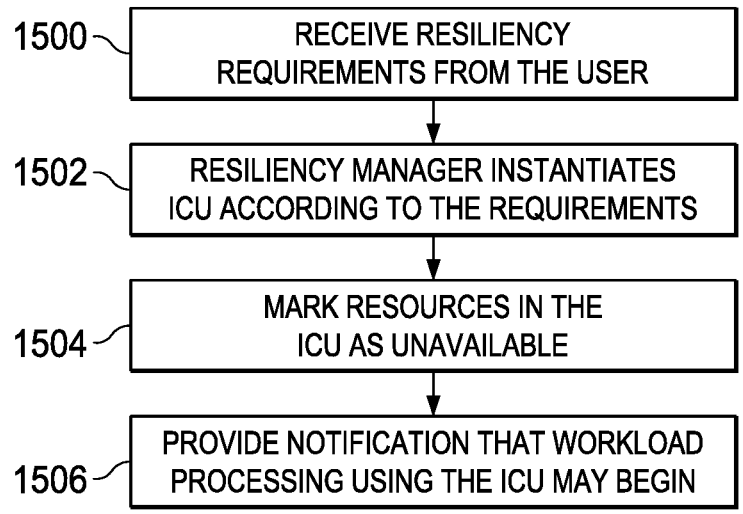
FIG. 15 depicts a representative process flow for configuring an ICU.

FIG. 15 depicts a representative process flow for configuring an ICU. As part of setup, preferably a user inputs resiliency requirements to the resiliency manager. This is step 1500. These resiliency requirements may vary but typically are one or more of: level of service required after a primary VM fails, budget, outage coverage (planned maintenance, unplanned outages, site disasters, etc.), recovery time objective (RTO), recovery point objective (RPO), system performance, uptime requirements, how rapidly a recovered VM is required, a number of simultaneous connections to be supported, whether redundant resources should be in warm standby, cold standby, hot standby, or active-active mode, and the like. The particular manner by which these requirements are specified may vary, but typically a web-based or other configuration interface may be used for this purpose. There may be defined sets of resiliency requirements (each a "policy") that are offered as defaults. Moreover, a particular resiliency requirement may be static or dynamic, and the requirements may include parameters. Using a configuration tool (e.g. a drop-n-drag tool), the user then configures the ICUs for the ICS. The configuration may include one ICS, or multiple ICSs, depending on the nature of the workload and the user's resiliency requirements for that workload. While ICSs and ICUs therein typically are manually specified, this is not a requirement, as the resiliency manager may provide a set of default(s). The resiliency manager provides such interfaces (visual or otherwise) to enable whatever degree of component resiliency may be desired or required by the user. This approach to software-defined resiliency through the resiliency manager enables the system to flexibly compose resources of different types, specs, and flavors to provide better quality of failure independence among redundant ICUs in a practical and flexible manner. At step 1502, the resiliency manager instantiates the ICU according to the user requirements as specified.

Preferably, and consistent with the other embodiments as described, once a particular resource is associated with an ICU (and thus an ICS), it is marked as unavailability in the associated resource pool. This is step 1504. Once the resource is no longer needed, it may be returned to its resource pool and then re-used in another ICU.

As step 1506, a notification is provided that the ICU is instantiated and workload processing using that ICU can then begin.

In a preferred embodiment, the resiliency manager has access to a library of ICS sets. Each ICS set contains two or more ICUs. As also noted, each ICU provides a logical description of physical and virtual resources and their associated configurations. Each ICU in an ICS set is functionally-equivalent. As used herein, the notion of "functional-equivalency" need not be an absolute requirement but may be met according to some defined criteria wherein ICUs provide substantially the same performance with respect to some defined processing, storage or other capability.

A particular ICU may be specified in an ICU specification. The ICU specification includes a logical description of the physical and virtual resources and their associated configurations necessary to implement the ICU. An ICU specification may have a particular format (e.g., XML, a Chef recipe document, or the like) so that it can be read and acted upon by the resiliency manager directly, or via configuration tools executed by the resiliency manager.

Figure 16:
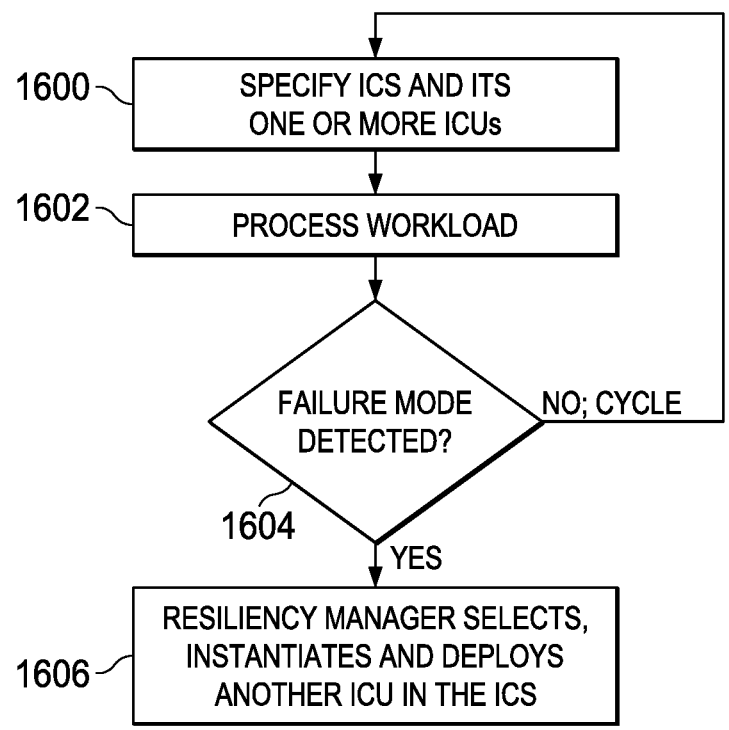
FIG. 16 depicts a high level process flow of the operation of the resiliency manager.

FIG. 16 depicts a high level process flow of the operation of the resiliency manager. One of more aspects of the resiliency manager may be implemented by other mechanisms in the disaggregate compute environment. As described above, typically the resiliency manager is implemented as computer software, namely, as sets of computer program instructions executed in hardware processors in or across computing machines within or otherwise associated with the data center. FIG. 16 begins at step 1600 with the specification of an ICS and its associated ICUs. At step 1602, processing of the workload in the disaggregate compute environment is initiated. The routine then enters a detection loop at step 1604 to detect whether some performance issue or failure of an ICU (or some component therein) is detected. If no performance issue or failure is detected, the routine cycles. If, however, the outcome of the test at step 1604 indicates a performance issue or failure mode has or is about to be entered, the resiliency manager dynamically selects, instantiates and deploys another ICU from the ICS set. This is step 1606. This completes the processing.

The particular ICU selected and deployed may vary (from among those ICUs in the ICS) based on some user- or system-specified requirement or constraint. In particular, and based on the logical description of resources needed and their configurations provided in each ICU that has been specified, the resiliency manager creates and deploys both the hardware and software resources for an ICU. At the hardware level, the creation and deployment of resources can be done through the resiliency manager functions described above with respect to FIG. 7. At the software level, the logical description of resources and configurations can be specified, e.g., using a configuration management tool such as Chef. In particular, the resiliency manager invokes a Chef recipe provided in the ICU specification to create and deploy the necessary ICU.

An ICU of an ICS may be created statically and placed in a standby mode until needed, or the ICS may be created/built dynamically (on-demand, or "on-the-fly") as needed when the resiliency manager receives an event indicative of a performance issue or failure.

The nature of the performance issue or failure that is detected by the resiliency manager of course may vary. The following provides representative use cases that differ based on the type of failure. A first use case is a scale-out policy that involves scale-out to resources of the same type and the same spec. In this example, the system is assumed to include a failure monitoring module that monitors resource utilization, e.g., incoming network traffic, outgoing network traffic. The module may be part of the resiliency manager or a standalone component. As part of the user inputs, system performance requirements are provided. The resiliency manager sets up one or more scale-out policies for responding to performance failures based on these requirements. e.g., when incoming traffic is >X but outgoing traffic is <Y, then scale out to more virtual CPUs. Of course, this is just a representative policy. As described in the process flow in FIG. 16, the resiliency manager compares performance situations reported by the failure monitoring module against those policies. If policy violations are detected, the resiliency manager responds by performing scale-out, preferably using resources of the same spec and same flavor or different flavors. For example, if a server is running on ARM processors, scale out is performed by adding more ARM processors of the same or different flavors.

A second use case implements a cross-scale policy preferably using resources of the same type but different specs or different flavors. In this example, and as part of the user inputs, one or more system recovery requirements (e.g., RTO) are provided. The resiliency manager uses these inputs to set up one or more cross-scale policies for responding to hard failures. A representative cross-scale policy might be "if RTO is X minutes, deploy a server pair in hot-standby mode" or "if RTO is X hours, deploy a VM pair in cold-standby mode." Of course, these are merely representative. Preferably, the redundant server is drawn from resources of different specs for fault independence. For example, the primary server may be Oracle database on pLinux, whereas the redundant server may be Oracle database on zLinux. Upon failure, the secondary Oracle database is initialized with backed-up or replicated data from the primary server, and it then takes over as the production database.

Depending on the recovery time objectives, hot recovery or warm recovery modes or even live/live mode may be used. These scenarios are now described.

Figure 17:
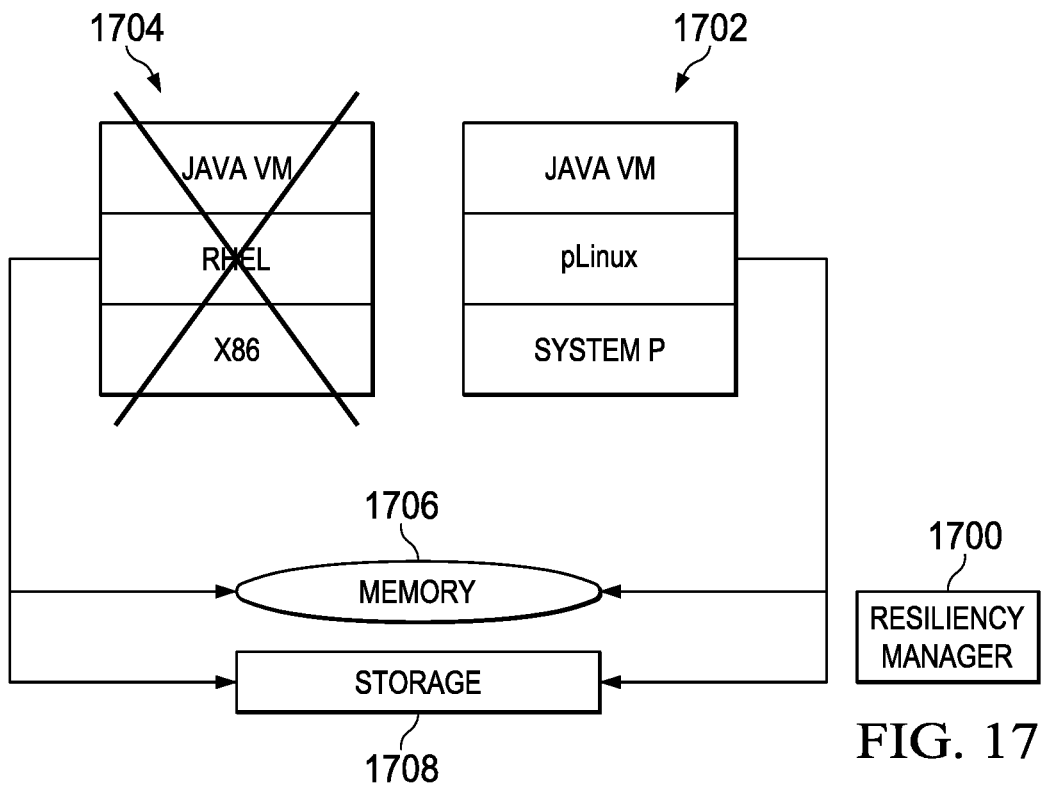
FIG. 17 depicts a representative first use case wherein the resiliency manager implements a scale-out policy.

FIG. 17 depicts a cold recovery scenario wherein the resiliency manager 1700 creates and deploys the new ICU 1702 after failure of the ICU 1704 and reuses memory 1706 and storage 1708 from failed ICU 1704. In the cold recovery mode, the resiliency manager 1700 identifies the failure, creates the new ICU 1702, promotes that ICU into active mode, and de-allocates the failed ICU 1704. The promoted ICU 1702 continues working on the same memory block 1706 and storage 1708. When there are multiple choices for creating the new ICU, preferably the resiliency manager selects one ICU over another based on some performance and/or other considerations, e.g., based on SLAs and cost requirements.

Figure 18:
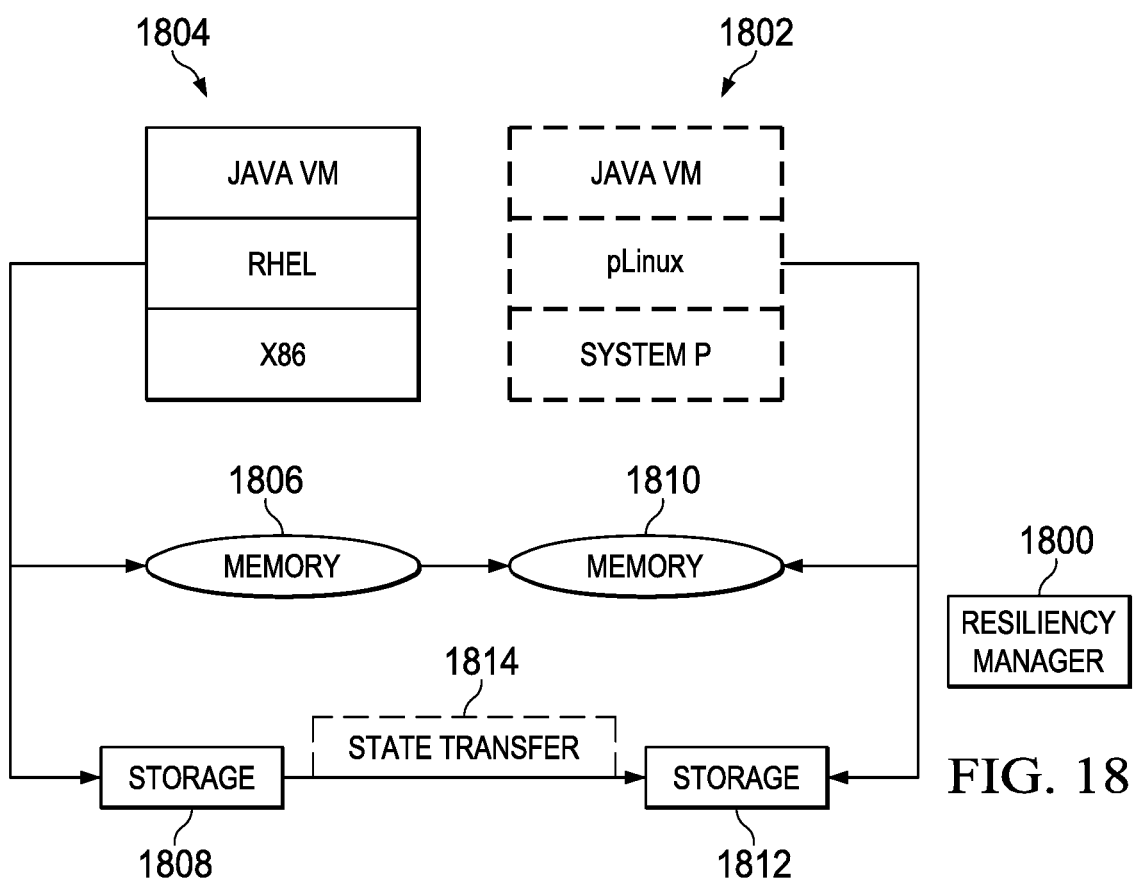
FIG. 18 depicts a representative second use case wherein the resiliency manager implements a cross-scale policy.

FIG. 18 depicts a warm recovery scenario wherein the resiliency manager 1800 performs a state transfer during normal mode. In this embodiment, the recovery ICU 1802 operates on standby until failover. In particular, in the warm recovery mode, the resiliency manager 1800 creates one or more standby ICU(s) 1802 (only one is depicted) when creating the active ICU 1804. Each standby ICU 1802 preferably has its own memory and storage. Thus, active ICU 1804 has memory 1806 and storage 1808, and recovery ICU 1802 has memory 1810 and storage 1812. The resiliency manager 1800 configures the one or more standby ICUs 1802 to receive state updates 1814 (e.g., through mirroring) from the memory and storage of the active ICU. When the performance issue or failure of the active ICU 1804 is identified, the resiliency manager 1800 promotes a standby ICU 1802 into the active mode, and de-allocates the failed ICU 1804.

The above-identified use cases and their policies are merely representative and are not intended to limit the scope of this disclosure.

The techniques described herein provides significant advantages. By composing disaggregated system resources of different types, specs, and/or flavors into functionally-equivalent redundant units (namely, the ICUs), the resiliency manager achieves practical and highly-tunable levels of failure independence needed for creating highly resilient systems. The resiliency approach enables the generation of redundant hardware and software units that exhibit a high degree of failure independence in a disaggregated environment. As has been described, the solution described herein leverages elements in the design of disaggregated systems to enable a user to define redundant computing units with sufficient diversity to reduce the chance of simultaneous failures. The approach reduces the likelihood that the same vulnerability will be exposed on the redundant units. It provides for highly-resilient systems that exhibit failure independence in a disaggregated environment.

The technique provides for software-defined resiliency by automatically translating an application's resiliency requirements (fault tolerance and performance) and cost requirements into selection of functionally equivalent redundant unit (ICU), e.g., upon the failure of a currently operating unit. To identify functionally equivalent redundant units, the approach herein leverages the diversity already available in the marketplace at the processor, memory, storage, OS, middleware, and sometimes, even application level through independent vendor offerings. Therefore, the proposed method is highly practical and straightforward to implement.

The techniques herein enable a service provider (e.g., a bare metal provider that offers services) to provide for fast failover onto functionally-equivalent-but-different resources in the event of faults.

The above-described resiliency approach thus strengthens the resiliency foundations of many IT infrastructures, for benign as well as malicious failures. For failures caused by malicious attacks, it is particularly important that redundant units do not expose the same vulnerabilities that can be exploited by an attacker. The approach herein significantly reduces the chance that redundant copies expose the same vulnerabilities, as in a typical use case they are composed of different hardware specs/flavors, different operating systems, and different application software. Indeed, compared to N-version programming, the technique provides improved quality of failure independence, greater flexibility, more cost-effectiveness, and highly-tunable diversity. Regarding failure independence, while N-version programming is focused on reducing the impact of software bugs, the described technique leverages unique features that are available in a disaggregated environment (availability of diverse resources of the same type) to provide failure independence for failures resulting from software as well as hardware faults. Regarding flexibility, N-version programming requires all the N versions to be up and running to tolerant N failures, even if no failure has actually occurred. In contrast, the technique of this disclosure has no such requirement and, indeed, the resiliency approach works with just one copy when there has been no failure, and a redundant copy among the N−1 redundant copies can be activated upon actual occurrence of failure and detection of that occurrence.

Regarding relative cost-effectiveness, the implementation of N-version programming starts with a specification and relies on programming efforts by N independent teams (that typically do not interact with respect to the programming process) to code against that specification. By design, this is a time-consuming and expensive approach. In contrast, the technique described herein leverages the diversity already available in the marketplace at the processor, memory, storage, OS, middleware, and sometimes, even application level through independent vendor offerings. As described, this advantage is achieved by combining diverse components at various levels of the IT stack into functionally equivalent redundant units (the ICUs).

Finally, and regarding diversity, N-version programming offers diversity only for the specific software functionality for which the N versions are implemented. In contrast, the technique herein allows for varying levels of diversity that can be flexibly chosen through software-defined resiliency at run-time, e.g., by a management software component of the disaggregated system (e.g., the resiliency manager).

As has been described, the functionality described above may be implemented as a standalone approach, e.g., a software-based function executed by a processor, or it may be available as a service (including as a web service via a SOAP/WL interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. As already noted, the techniques herein also may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to workload management schemes, such as described above.

The nomenclature "specs" and "flavors" is provided for explanatory purposes and, unless the context dictates otherwise, should not be deemed to limit the disclosure here. The specs may derive from sources such as an Industry Standard specification, a vendor-specific specification, or the like. The flavors, as noted, typically correspond to a release or version (in the context of software), but may be generalized as a set of some defined set of properties, attributes or characteristics. The nomenclature notwithstanding, the notion is to provide an ICS that specifies a set of functionally-equivalent ICUs, wherein each ICU is a logical description of physical and virtual resources and their associated configurations.

Without limiting the disclosure, and although ICUs are composed from resources drawn from the resource pools, preferably a particular tenant in the disaggregate compute environment has its own ICS (and thus its ICUs).

The invention claimed is:

1. A method for assigning resources in a compute environment, comprising
   providing a set of resource pools of individual hardware components used to instantiate a disaggregated server entity, wherein each respective resource pool of the set of resource pools comprises a set of resources of a same type each physically located in a common enclosure exclusive to containing resources not of the same type, and wherein each resource of the set of resources of the same type within each respective resource pool is of a type, specification, and flavor;
   responsive to receipt of data indicating a resiliency requirement, defining a set of interchangeable compute units (ICUs) wherein, with respect to the resiliency requirement, each ICU in the set is substantially functionally-equivalent, and wherein each ICU is composed of resources drawn from the set of resource pools, and wherein a first ICU in the set has a different set of components than a second ICU in the set, and wherein defining the set of ICUs includes defining the set of ICUs according to a diversity parameter selected from a plurality of diversity parameters by a user, with respect to the type, specification, and flavor, upon configuration of the resiliency requirement such that a higher diversity parameter results in ICUs in the set with more diverse sets of components;

responsive to defining the set of ICUs, instantiating, in real-time, the disaggregated server entity for performing a workload bound by the resiliency requirement, wherein the disaggregated server entity is instantiated as a non-virtualized server entity composed of resources drawn from the individual hardware resources of respective pools of the set of resource pools according to the set of ICUs; and as the workload is being processed, and responsive to receipt of an indication of a performance issue or failure associated with the first ICU being used to process the workload, deploying the second ICU to process the workload.

2. The method of claim 1, wherein each ICU is defined by a logical description of physical and virtual resources in the resource pools, together with their associated configurations.

3. The method of claim 1, wherein the ICUs are hosted on one of: resources of the same type each with different specifications, and resources of the same type and specification and different flavors.

4. The method of claim 1, wherein the second ICU is not defined until receipt of the indication of the performance issue or failure associated with the first ICU.

5. The method of claim 1, further including:
detecting a fault;
determining a type of the fault;
based on the type of the fault determined, and according to a resiliency policy, identifying the second ICU.

6. The method of claim 1, further including:
de-allocating the first ICU upon deploying the second ICU; and
returning components used to define the first ICU back to their respective resource pools.

7. The method of claim 1, wherein resources are assigned for multiple tenants, and at least first and second of the multiple tenants have different resiliency requirements and distinct sets of ICUs.

8. A system for assigning resources in a compute environment, comprising:
one or more hardware processors;
computer memory holding computer program instructions executed by the hardware processors and operative to:
providing a set of resource pools of individual hardware components used to instantiate a disaggregated server entity, wherein each respective resource pool of the set of resource pools comprises a set of resources of a same type each physically located in a common enclosure exclusive to containing resources not of the same type, and wherein each resource of the set of resources of the same type within each respective resource pool is of a type, specification, and flavor;
responsive to receipt of data indicating a resiliency requirement, define a set of interchangeable compute units (ICUs) wherein, with respect to the resiliency requirement, each ICU in the set is substantially functionally-equivalent, and wherein each ICU is composed of resources drawn from the set of resource pools, and wherein a first ICU in the set has a different set of components than a second ICU in the set, and wherein defining the set of ICUs includes defining the set of ICUs according to a diversity parameter selected from a plurality of diversity parameters by a user, with respect to the type, specification, and flavor, upon configuration of the resiliency requirement such that a higher diversity parameter results in ICUs in the set with more diverse sets of components;

responsive to defining the set of ICUs, instantiate, in real-time, the disaggregated server entity for performing a workload bound by the resiliency requirement, wherein the disaggregated server entity is instantiated as a non-virtualized server entity composed of resources drawn from the individual hardware resources of respective pools of the set of resource pools according to the set of ICUs; and as the workload is being processed, and responsive to receipt of an indication of a performance issue or failure associated with the first ICU being used to process the workload, deploy the second ICU to process the workload.

9. The system of claim 8, wherein each ICU is defined by a logical description of physical and virtual resources in the resource pools, together with their associated configurations.

10. The system of claim 8, wherein the ICUs are hosted on one of: resources of the same type each with different specifications, and resources of the same type and specification and different flavors.

11. The system of claim 8, wherein the second ICU is not defined until receipt of the indication of the performance issue or failure associated with the first ICU.

12. The system of claim 8, wherein the computer program instructions are further operative to:
detect a fault;
determine a type of the fault;
based on the type of the fault determined, and according to a resiliency policy, identify the second ICU.

13. The system of claim 8, wherein the computer program instructions are further operative to:
de-allocate the first ICU upon deploying the second ICU; and
return components used to define the first ICU back to their respective resource pools.

14. The system of claim 8, wherein resources are assigned for multiple tenants, and at least first and second of the multiple tenants have different resiliency requirements and distinct sets of ICUs.

15. A computer program product in a non-transitory computer readable medium for use in a data processing system for assigning resources in a compute environment, the computer program product holding computer program instructions executed in the data processing system and operative to:
provide a set of resource pools of individual hardware components used to instantiate a disaggregated server entity, wherein each respective resource pool of the set of resource pools comprises a set of resources of a same type physically each located in a common enclosure exclusive to containing resources not of the same type, and wherein each resource of the set of resources of the same type within each respective resource pool is of a type, specification, and flavor;
responsive to receipt of data indicating a resiliency requirement, define a set of interchangeable compute units (ICUs) wherein, with respect to the resiliency requirement, each ICU in the set is substantially functionally-equivalent, and wherein each ICU is composed of resources drawn from the set of resource pools, and wherein a first ICU in the set has a different set of components than a second ICU in the set, and wherein defining the set of ICUs includes defining the set of ICUs according to a diversity parameter selected from a plurality of diversity parameters by a user, with respect to the type, specification, and flavor, upon configuration of the resiliency requirement such that a higher diversity parameter results in ICUs in the set with more diverse sets of components;

responsive to defining the set of ICUs, instantiate, in real-time, the disaggregated server entity for performing a workload bound by the resiliency requirement, wherein the disaggregated server entity is instantiated as a non-virtualized server entity composed of resources drawn from the individual hardware resources of respective pools of the set of resource pools according to the set of ICUs; and as the workload is being processed, and responsive to receipt of an indication of a performance issue or failure associated with the first ICU being used to process the workload, deploy the second ICU to process the workload.

16. The computer program product of claim 15, wherein each ICU is defined by a logical description of physical and virtual resources in the resource pools, together with their associated configurations.

17. The computer program product of claim 15, wherein the ICUs are hosted on one of: resources of the same type each with different specifications, and resources of the same type and specification and different flavors.

18. The computer program product of claim 15, wherein the second ICU is not defined until receipt of the indication of the performance issue or failure associated with the first ICU.

19. The computer program product of claim 15, wherein the computer program instructions are further operative to:
detect a fault;
determine a type of the fault;
based on the type of the fault determined, and according to a resiliency policy, identify the second ICU.

20. The computer program product of claim 15, wherein the computer program instructions are further operative to:
de-allocate the first ICU upon deploying the second ICU; and
return components used to define the first ICU back to their respective resource pools.

21. The computer program product of claim 15, wherein resources are assigned for multiple tenants, and at least first and second of the multiple tenants have different resiliency requirements and distinct sets of ICUs.

22. A data center facility, comprising:
a set of resource pools, each respective resource pool of the set of resource pools comprising a set of resources of a same type each physically located in a common enclosure exclusive to containing resources not of the like-type, the set of resource pools further comprising, for at least one resource type, a specifications pool, and a flavors pool, wherein first and second computing units that are functionally-equivalent are hosted on one of: resources of a same type each with different specifications drawn from the specifications pools, and resources of the same type and specification and different flavors drawn from the flavors pool;
a disaggregated compute system instantiated in real-time as a non-virtualized server entity composed of individual hardware resources selected from the set of resource pools, the disaggregated compute system being configured to perform a workload meeting a resiliency requirement associated with a tenant, wherein, responsive to receiving the resiliency requirement by the disaggregated compute system, a set of interchangeable compute units (ICUs), inclusive of the first and second computing units that are functionally-equivalent, is defined with respect to the resiliency requirement, wherein a first ICU in the set has a different set of components than a second ICU in the set, and wherein defining the set of ICUs includes defining the set of ICUs according to a diversity parameter selected from a plurality of diversity parameters by a user, with respect to the type, specification, and flavor, upon configuration of the resiliency requirement such that a higher diversity parameter results in ICUs in the set with more diverse sets of components; and
a resiliency manager executing in a hardware element and responsive to a failure in one or more resources in the disaggregated compute system as the tenant's workload is processed to selectively adjust a composition of the disaggregate compute system to maintain the resiliency requirement.

* * * * *